(12) United States Patent
Isomura et al.

(10) Patent No.: US 6,941,443 B2
(45) Date of Patent: Sep. 6, 2005

(54) METHOD OF USING MEMORY, TWO DIMENSIONAL DATA ACCESS MEMORY AND OPERATION PROCESSING APPARATUS

(75) Inventors: Masakazu Isomura, Tokyo (JP); Toshihiro Kubo, Ota-ku (JP)

(73) Assignee: Seiko Epson Corporation, Tokyo (JP)

( * ) Notice: Subject to any disclaimer, the term of this patent is extended or adjusted under 35 U.S.C. 154(b) by 489 days.

(21) Appl. No.: 09/984,439

(22) Filed: Oct. 30, 2001

(65) Prior Publication Data

US 2002/0083292 A1 Jun. 27, 2002

(30) Foreign Application Priority Data

Nov. 22, 2000 (JP) ........................................ 2000-355945
Mar. 29, 2001 (JP) ........................................ 2001-097520

(51) Int. Cl.[7] .............................................. G06F 12/00
(52) U.S. Cl. ....................................... 711/209; 711/217
(58) Field of Search .................................. 365/220, 221, 365/230.03, 238.5, 239; 711/154, 158, 167, 203, 209, 213, 217, 218

(56) References Cited

U.S. PATENT DOCUMENTS

| | | | | |
|---|---|---|---|---|
| 4,875,190 A | * | 10/1989 | Sakano | 365/189.04 |
| 4,935,880 A | * | 6/1990 | Kelleher et al. | 345/545 |
| 5,535,220 A | * | 7/1996 | Kanno et al. | 714/701 |
| 5,619,676 A | * | 4/1997 | Fukuda et al. | 711/137 |
| 5,638,533 A | * | 6/1997 | Law | 711/157 |
| 5,910,794 A | * | 6/1999 | Schneider | 345/656 |
| 6,512,759 B1 | * | 1/2003 | Hashimoto et al. | 370/347 |

FOREIGN PATENT DOCUMENTS

| | | |
|---|---|---|
| JP | 5-22629 A | 1/1993 |
| JP | 2000-69478 A | 3/2000 |

* cited by examiner

*Primary Examiner*—Christian P. Chace
(74) *Attorney, Agent, or Firm*—Oliff & Berridge, PLC

(57) ABSTRACT

To provide a method of using a memory that can contribute to an efficient SIMD operation. The method of using the memory includes the steps of: supposing a predefined two dimensional memory space consisting of predefined virtual minimum two dimensional memory spaces 1 arranged in longitudinal and transverse directions; and preassigning each address of the virtual minimum two dimensional memory space 1 to an address in each of n physical memories determined in relation with the virtual minimum two dimensional memory space. At the time of reading the data, a reading address is designated in the virtual minimum two dimensional memory space 1, and a data reading direction is designated as the transverse direction or longitudinal direction of data with reference to the designated reading address, whereby continuous data arranged in the transverse or longitudinal direction in the virtual minimum two dimensional memory space 1 is read in accordance with the designated address and the designated direction from a corresponding address in each of the n physical memories.

10 Claims, 27 Drawing Sheets

FIG. 1

| $a_n(0)$ | $b_n(0)$ | $c_n(0)$ | $d_n(0)$ |
|---|---|---|---|
| $c_n(1)$ | $d_n(1)$ | $a_n(1)$ | $b_n(1)$ |
| $b_n(2)$ | $a_n(2)$ | $d_n(2)$ | $c_n(2)$ |
| $d_n(3)$ | $c_n(3)$ | $b_n(3)$ | $a_n(3)$ |

FIG. 2

|  | MEMORY 4A | MEMORY 4B | MEMORY 4C | MEMORY 4D |
|---|---|---|---|---|
| 4n | $a_n(0)$ | $b_n(0)$ | $c_n(0)$ | $d_n(0)$ |
| 4n+1 | $a_n(1)$ | $b_n(1)$ | $c_n(1)$ | $d_n(1)$ |
| 4n+2 | $a_n(2)$ | $b_n(2)$ | $c_n(2)$ | $d_n(2)$ |
| 4n+3 | $a_n(3)$ | $b_n(3)$ | $c_n(3)$ | $d_n(3)$ |
|  | ⋮ | ⋮ | ⋮ | ⋮ |

FIG. 8

| No. | READING ACCESS MODE | READING ADDRESS A0 | A1 | A4 | A5 | SELECTOR 24A | SELECTOR 24B | SELECTOR 24C | SELECTOR 24D |
|---|---|---|---|---|---|---|---|---|---|
| 1 | ROW DIRECTION ACCESS MODE (00) | 0 | 0 | 0 | 0 | 4A | 4B | 4C | 4D |
| 2 | | 1 | 0 | 0 | 0 | 4B | 4C | 4D | 4A |
| 3 | | 0 | 1 | 0 | 0 | 4C | 4D | 4A | 4B |
| 4 | | 1 | 1 | 0 | 0 | 4D | 4A | 4D | 4C |
| 5 | | 0 | 0 | 1 | 0 | 4C | 4D | 4A | 4B |
| 6 | | 1 | 0 | 1 | 0 | 4D | 4A | 4B | 4C |
| 7 | | 0 | 1 | 1 | 0 | 4A | 4B | 4C | 4D |
| 8 | | 1 | 1 | 1 | 0 | 4B | 4C | 4D | 4A |
| 9 | | 0 | 0 | 0 | 1 | 4B | 4A | 4D | 4C |
| 10 | | 1 | 0 | 0 | 1 | 4A | 4D | 4C | 4B |
| 11 | | 0 | 1 | 0 | 1 | 4D | 4C | 4B | 4A |
| 12 | | 1 | 1 | 0 | 1 | 4C | 4B | 4A | 4D |
| 13 | | 0 | 0 | 1 | 1 | 4D | 4C | 4B | 4A |
| 14 | | 1 | 0 | 1 | 1 | 4C | 4B | 4A | 4D |
| 15 | | 0 | 1 | 1 | 1 | 4B | 4A | 4D | 4C |
| 16 | | 1 | 1 | 1 | 1 | 4A | 4D | 4C | 4B |
| 17 | COLUMN DIRECTION ACCESS MODE (01) | 0 | 0 | 0 | 0 | 4A | 4C | 4B | 4D |
| 18 | | 1 | 0 | 0 | 0 | 4B | 4D | 4A | 4C |
| 19 | | 0 | 1 | 0 | 0 | 4C | 4A | 4D | 4B |
| 20 | | 1 | 1 | 0 | 0 | 4D | 4B | 4C | 4A |
| 21 | | 0 | 0 | 1 | 0 | 4C | 4B | 4D | 4A |
| 22 | | 1 | 0 | 1 | 0 | 4D | 4A | 4C | 4D |
| 23 | | 0 | 1 | 1 | 0 | 4A | 4D | 4B | 4C |
| 24 | | 1 | 1 | 1 | 0 | 4B | 4C | 4A | 4D |
| 25 | | 0 | 0 | 0 | 1 | 4B | 4D | 4A | 4C |
| 26 | | 1 | 0 | 0 | 1 | 4A | 4C | 4B | 4D |
| 27 | | 0 | 1 | 0 | 1 | 4D | 4B | 4A | 4C |
| 28 | | 1 | 1 | 0 | 1 | 4C | 4A | 4D | 4B |
| 29 | | 0 | 0 | 1 | 1 | 4D | 4A | 4C | 4B |
| 30 | | 1 | 0 | 1 | 1 | 4C | 4B | 4D | 4A |
| 31 | | 0 | 1 | 1 | 1 | 4B | 4C | 4A | 4D |
| 32 | | 1 | 1 | 1 | 1 | 4A | 4D | 4B | 4C |
| 33 | COLUMN DIRECTION TWO STAGE ACCESS MODE 16bit×2 (10) | 0 | 0 | 0 | 0 | 4A | 4B | 4C | 4D |
| 34 | | 0 | 1 | 0 | 0 | 4C | 4D | 4A | 4B |
| 35 | | 0 | 0 | 1 | 0 | 4C | 4D | 4B | 4A |
| 36 | | 0 | 1 | 1 | 0 | 4A | 4B | 4D | 4C |
| 37 | | 0 | 0 | 0 | 1 | 4B | 4A | 4D | 4C |
| 38 | | 0 | 1 | 0 | 1 | 4D | 4C | 4B | 4A |
| 39 | | 0 | 0 | 1 | 1 | 4D | 4C | 4A | 4B |
| 40 | | 0 | 1 | 1 | 1 | 4B | 4A | 4C | 4D |

FIG. 9

| READING ACCESS MODE | READING ADDRESS | | | | MEMORY4A | | MEMORY4B | | MEMORY4C | | MEMORY4D | |
|---|---|---|---|---|---|---|---|---|---|---|---|---|
| | A0 | A1 | A4 | A5 | a0 | a1 | a0 | a1 | a0 | a1 | a0 | a1 |
| ROW DIRECTION ACCESS MODE | — | — | 0 | 0 | 0 | 0 | 0 | 0 | 0 | 0 | 0 | 0 |
| | — | — | 1 | 0 | 1 | 0 | 1 | 0 | 1 | 0 | 1 | 0 |
| | — | — | 0 | 1 | 0 | 1 | 0 | 1 | 0 | 1 | 0 | 1 |
| | — | — | 1 | 1 | 1 | 1 | 1 | 1 | 1 | 1 | 1 | 1 |
| COLUMN DIRECTION ACCESS MODE | 0 | 0 | — | — | 0 | 0 | 0 | 1 | 1 | 0 | 1 | 1 |
| | 1 | 0 | — | — | 0 | 1 | 0 | 0 | 1 | 1 | 1 | 0 |
| | 0 | 1 | — | — | 1 | 0 | 1 | 1 | 0 | 0 | 0 | 1 |
| | 1 | 1 | — | — | 1 | 1 | 1 | 0 | 0 | 1 | 1 | 1 |
| COLUMN DIRECTION TWO STAGE ACCESS MODE (16bit×2) | 0 | 0 | 0 | 0 | 0 | 0 | 0 | 0 | 1 | 0 | 1 | 0 |
| | 0 | 0 | 1 | 0 | 0 | 1 | 0 | 1 | 1 | 0 | 1 | 0 |
| | 0 | 0 | 0 | 1 | 0 | 1 | 0 | 1 | 1 | 1 | 1 | 1 |
| | 0 | 0 | 1 | 1 | 0 | 0 | 0 | 0 | 1 | 1 | 1 | 1 |
| | 0 | 1 | 0 | 0 | 1 | 0 | 1 | 0 | 0 | 0 | 0 | 0 |
| | 0 | 1 | 1 | 0 | 1 | 0 | 1 | 0 | 0 | 1 | 0 | 1 |
| | 0 | 1 | 0 | 1 | 1 | 1 | 1 | 1 | 0 | 1 | 0 | 1 |
| | 0 | 1 | 1 | 1 | 1 | 1 | 1 | 1 | 0 | 0 | 0 | 0 |

FIG. 10

| No. | READING ACCESS MODE | READING ADDRESS ||||ADDRESS CORRECTING SECTION22A | ADDRESS CORRECTING SECTION22B | ADDRESS CORRECTING SECTION22C | ADDRESS CORRECTING SECTION22D |
|---|---|---|---|---|---|---|---|---|---|
| | | A0 | A1 | A4 | A5 | | | | |
| 1 | ROW DIRECTION ACCESS MODE (00) | 0 | 0 | 0 | 0 | 0 | 0 | 0 | 0 |
| 2 | | 1 | 0 | 0 | 0 | +1 | 0 | 0 | 0 |
| 3 | | 0 | 1 | 0 | 0 | +1 | +1 | 0 | 0 |
| 4 | | 1 | 1 | 0 | 0 | +1 | +1 | +1 | 0 |
| 5 | | 0 | 0 | 1 | 0 | 0 | 0 | 0 | 0 |
| 6 | | 1 | 0 | 1 | 0 | 0 | 0 | +1 | 0 |
| 7 | | 0 | 1 | 1 | 0 | 0 | 0 | +1 | +1 |
| 8 | | 1 | 1 | 1 | 0 | +1 | 0 | +1 | +1 |
| 9 | | 0 | 0 | 0 | 1 | 0 | 0 | 0 | 0 |
| 10 | | 1 | 0 | 0 | 1 | 0 | +1 | 0 | 0 |
| 11 | | 0 | 1 | 0 | 1 | +1 | +1 | 0 | 0 |
| 12 | | 1 | 1 | 0 | 1 | +1 | +1 | 0 | +1 |
| 13 | | 0 | 0 | 1 | 1 | 0 | 0 | 0 | 0 |
| 14 | | 1 | 0 | 1 | 1 | 0 | 0 | 0 | +1 |
| 15 | | 0 | 1 | 1 | 1 | 0 | 0 | +1 | +1 |
| 16 | | 1 | 1 | 1 | 1 | 0 | +1 | +1 | +1 |
| 17 | COLUMN DIRECTION ACCESS MODE (01) | 0 | 0 | 0 | 0 | 0 | 0 | 0 | 0 |
| 18 | | 1 | 0 | 0 | 0 | 0 | 0 | 0 | 0 |
| 19 | | 0 | 1 | 0 | 0 | 0 | 0 | 0 | 0 |
| 20 | | 1 | 1 | 0 | 0 | 0 | 0 | 0 | 0 |
| 21 | | 0 | 0 | 1 | 0 | +4 | 0 | 0 | 0 |
| 22 | | 1 | 0 | 1 | 0 | 0 | +4 | 0 | 0 |
| 23 | | 0 | 1 | 1 | 0 | 0 | 0 | +4 | 0 |
| 24 | | 1 | 1 | 1 | 0 | 0 | 0 | 0 | +4 |
| 25 | | 0 | 0 | 0 | 1 | +4 | 0 | +4 | 0 |
| 26 | | 1 | 0 | 0 | 1 | 0 | +4 | 0 | +4 |
| 27 | | 0 | 1 | 0 | 1 | +4 | 0 | +4 | 0 |
| 28 | | 1 | 1 | 0 | 1 | 0 | +4 | 0 | +4 |
| 29 | | 0 | 0 | 1 | 1 | +4 | +4 | +4 | 0 |
| 30 | | 1 | 0 | 1 | 1 | +4 | +4 | 0 | +4 |
| 31 | | 0 | 1 | 1 | 1 | +4 | 0 | +4 | +4 |
| 32 | | 1 | 1 | 1 | 1 | 0 | +4 | +4 | +4 |
| 33 | COLUMN DIRECTION TWO STAGE ACCESS MODE 16bit×2 (10) | 0 | 0 | 0 | 0 | 0 | 0 | 0 | 0 |
| 34 | | 0 | 1 | 0 | 0 | 0 | 0 | 0 | 0 |
| 35 | | 0 | 0 | 1 | 0 | 0 | 0 | 0 | 0 |
| 36 | | 0 | 1 | 1 | 0 | 0 | 0 | 0 | 0 |
| 37 | | 0 | 0 | 0 | 1 | 0 | 0 | 0 | 0 |
| 38 | | 0 | 1 | 0 | 1 | 0 | 0 | 0 | 0 |
| 39 | | 0 | 0 | 1 | 1 | +4 | +4 | 0 | 0 |
| 40 | | 0 | 1 | 1 | 1 | 0 | 0 | +4 | +4 |

FIG. 19
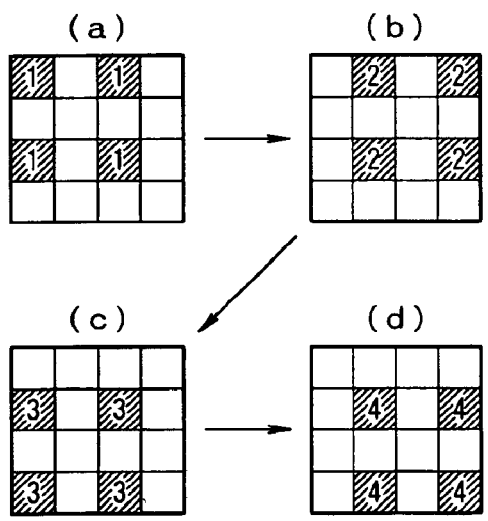
FIG. 20
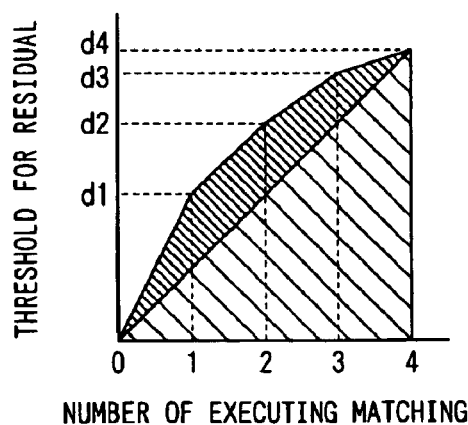
FIG. 21

FIG. 24

(CONDITION: CIRCULAR MODE, AND A2=A3=1)

| No. | READING ACCESS MODE | READING ADDRESS ||||  ADDRESS CORRECTING SECTION22A | ADDRESS CORRECTING SECTION22B | ADDRESS CORRECTING SECTION22C | ADDRESS CORRECTING SECTION22D |
|---|---|---|---|---|---|---|---|---|---|
| | | A0 | A1 | A4 | A5 | | | | |
| 1  | ROW DIRECTION ACCESS MODE (00) | 0 | 0 | 0 | 0 | 0  | 0  | 0  | 0  |
| 2  | | 1 | 0 | 0 | 0 | -3 | 0  | 0  | 0  |
| 3  | | 0 | 1 | 0 | 0 | -3 | -3 | 0  | 0  |
| 4  | | 1 | 1 | 0 | 0 | -3 | -3 | -3 | 0  |
| 5  | | 0 | 0 | 1 | 0 | 0  | 0  | 0  | 0  |
| 6  | | 1 | 0 | 1 | 0 | 0  | 0  | -3 | 0  |
| 7  | | 0 | 1 | 1 | 0 | 0  | 0  | -3 | -3 |
| 8  | | 1 | 1 | 1 | 0 | -3 | 0  | -3 | -3 |
| 9  | | 0 | 0 | 0 | 1 | 0  | 0  | 0  | 0  |
| 10 | | 1 | 0 | 0 | 1 | 0  | -3 | 0  | 0  |
| 11 | | 0 | 1 | 0 | 1 | -3 | -3 | 0  | 0  |
| 12 | | 1 | 1 | 0 | 1 | -3 | -3 | 0  | -3 |
| 13 | | 0 | 0 | 1 | 1 | 0  | 0  | 0  | 0  |
| 14 | | 1 | 0 | 1 | 1 | 0  | 0  | 0  | -3 |
| 15 | | 0 | 1 | 1 | 1 | 0  | 0  | -3 | -3 |
| 16 | | 1 | 1 | 1 | 1 | 0  | -3 | -3 | -3 |

FIG. 25

(CONDITION: CIRCULAR MODE, AND A6=A7=A8=A9=1)

| No. | READING ACCESS MODE | READING ADDRESS | | | | ADDRESS CORRECTING SECTION 22A | ADDRESS CORRECTING SECTION 22B | ADDRESS CORRECTING SECTION 22C | ADDRESS CORRECTING SECTION 22D |
|---|---|---|---|---|---|---|---|---|---|
| | | A0 | A1 | A4 | A5 | | | | |
| 17 | COLUMN DIRECTION ACCESS MODE (01) | 0 | 0 | 0 | 0 | 0 | 0 | 0 | 0 |
| 18 | | 1 | 0 | 0 | 0 | 0 | 0 | 0 | 0 |
| 19 | | 0 | 1 | 0 | 0 | 0 | 0 | 0 | 0 |
| 20 | | 1 | 1 | 0 | 0 | 0 | 0 | 0 | 0 |
| 21 | | 0 | 0 | 1 | 0 | $-(n-4)$ | 0 | 0 | 0 |
| 22 | | 1 | 0 | 1 | 0 | 0 | $-(n-4)$ | 0 | 0 |
| 23 | | 0 | 1 | 1 | 0 | 0 | 0 | $-(n-4)$ | 0 |
| 24 | | 1 | 1 | 1 | 0 | 0 | 0 | 0 | $-(n-4)$ |
| 25 | | 0 | 0 | 0 | 1 | $-(n-4)$ | 0 | $-(n-4)$ | 0 |
| 26 | | 1 | 0 | 0 | 1 | 0 | $-(n-4)$ | 0 | $-(n-4)$ |
| 27 | | 0 | 1 | 0 | 1 | $-(n-4)$ | 0 | $-(n-4)$ | 0 |
| 28 | | 1 | 1 | 0 | 1 | 0 | $-(n-4)$ | 0 | $-(n-4)$ |
| 29 | | 0 | 0 | 1 | 1 | $-(n-4)$ | $-(n-4)$ | $-(n-4)$ | 0 |
| 30 | | 1 | 0 | 1 | 1 | $-(n-4)$ | $-(n-4)$ | 0 | $-(n-4)$ |
| 31 | | 0 | 1 | 1 | 1 | $-(n-4)$ | 0 | $-(n-4)$ | $-(n-4)$ |
| 32 | | 1 | 1 | 1 | 1 | 0 | $-(n-4)$ | $-(n-4)$ | $-(n-4)$ |
| 33 | COLUMN DIRECTION TWO STAGE ACCESS MODE 16bit×2 (10) | 0 | 0 | 0 | 0 | 0 | 0 | 0 | 0 |
| 34 | | 0 | 1 | 0 | 0 | 0 | 0 | 0 | 0 |
| 35 | | 0 | 0 | 1 | 0 | 0 | 0 | 0 | 0 |
| 36 | | 0 | 1 | 1 | 0 | 0 | 0 | 0 | 0 |
| 37 | | 0 | 0 | 0 | 1 | 0 | 0 | 0 | 0 |
| 38 | | 0 | 1 | 0 | 1 | 0 | 0 | 0 | 0 |
| 39 | | 0 | 0 | 1 | 1 | $-(n-4)$ | $-(n-4)$ | 0 | 0 |
| 40 | | 0 | 1 | 1 | 1 | 0 | 0 | $-(n-4)$ | $-(n-4)$ |

FIG. 26

(CONDITION: PADDING MODE, AND A2=A3=1 OR A6=A7=A8=A9=1)

| No. | READING ACCESS MODE | READING ADDRESS A0 | A1 | A4 | A5 | SELECTOR 24A | SELECTOR 24B | SELECTOR 24C | SELECTOR 24D |
|---|---|---|---|---|---|---|---|---|---|
| 1  | ROW DIRECTION ACCESS MODE (00) | 0 | 0 | 0 | 0 | 4A | 4B | 4C | 4D |
| 2  | | 1 | 0 | 0 | 0 | 4B | 4C | 4D | 4D |
| 3  | | 0 | 1 | 0 | 0 | 4C | 4D | 4D | 4D |
| 4  | | 1 | 1 | 0 | 0 | 4D | 4D | 4D | 4D |
| 5  | | 0 | 0 | 1 | 0 | 4C | 4D | 4A | 4B |
| 6  | | 1 | 0 | 1 | 0 | 4D | 4A | 4B | 4B |
| 7  | | 0 | 1 | 1 | 0 | 4A | 4B | 4B | 4B |
| 8  | | 1 | 1 | 1 | 0 | 4B | 4B | 4B | 4B |
| 9  | | 0 | 0 | 0 | 1 | 4B | 4A | 4D | 4C |
| 10 | | 1 | 0 | 0 | 1 | 4A | 4D | 4C | 4C |
| 11 | | 0 | 1 | 0 | 1 | 4D | 4C | 4C | 4C |
| 12 | | 1 | 1 | 0 | 1 | 4C | 4C | 4C | 4C |
| 13 | | 0 | 0 | 1 | 1 | 4D | 4C | 4B | 4A |
| 14 | | 1 | 0 | 1 | 1 | 4C | 4B | 4A | 4A |
| 15 | | 0 | 1 | 1 | 1 | 4B | 4A | 4A | 4A |
| 16 | | 1 | 1 | 1 | 1 | 4A | 4A | 4A | 4A |
| 17 | COLUMN DIRECTION ACCESS MODE (01) | 0 | 0 | 0 | 0 | 4A | 4C | 4B | 4D |
| 18 | | 1 | 0 | 0 | 0 | 4B | 4D | 4A | 4C |
| 19 | | 0 | 1 | 0 | 0 | 4C | 4A | 4D | 4B |
| 20 | | 1 | 1 | 0 | 0 | 4D | 4B | 4C | 4A |
| 21 | | 0 | 0 | 1 | 0 | 4C | 4B | 4D | 4D |
| 22 | | 1 | 0 | 1 | 0 | 4D | 4A | 4C | 4C |
| 23 | | 0 | 1 | 1 | 0 | 4A | 4D | 4B | 4B |
| 24 | | 1 | 1 | 1 | 0 | 4B | 4C | 4A | 4A |
| 25 | | 0 | 0 | 0 | 1 | 4B | 4D | 4D | 4D |
| 26 | | 1 | 0 | 0 | 1 | 4A | 4C | 4C | 4C |
| 27 | | 0 | 1 | 0 | 1 | 4D | 4B | 4B | 4B |
| 28 | | 1 | 1 | 0 | 1 | 4C | 4A | 4A | 4A |
| 29 | | 0 | 0 | 1 | 1 | 4D | 4D | 4D | 4D |
| 30 | | 1 | 0 | 1 | 1 | 4C | 4C | 4C | 4C |
| 31 | | 0 | 1 | 1 | 1 | 4B | 4B | 4B | 4B |
| 32 | | 1 | 1 | 1 | 1 | 4A | 4A | 4A | 4A |
| 33 | COLUMN DIRECTION TWO STAGE ACCESS MODE 16bit×2 (10) | 0 | 0 | 0 | 0 | 4A | 4B | 4C | 4D |
| 34 | | 0 | 1 | 0 | 0 | 4C | 4D | 4A | 4B |
| 35 | | 0 | 0 | 1 | 0 | 4C | 4D | 4B | 4A |
| 36 | | 0 | 1 | 1 | 0 | 4A | 4B | 4D | 4C |
| 37 | | 0 | 0 | 0 | 1 | 4B | 4A | 4D | 4C |
| 38 | | 0 | 1 | 0 | 1 | 4D | 4C | 4B | 4A |
| 39 | | 0 | 0 | 1 | 1 | 4D | 4C | 4D | 4C |
| 40 | | 0 | 1 | 1 | 1 | 4B | 4A | 4B | 4A |

FIG. 27

| No. | READING ACCESS MODE | READING ADDRESS A0 | A1 | A4 | A5 | SELECTOR 24A | SELECTOR 24B | SELECTOR 24C | SELECTOR 24D |
|---|---|---|---|---|---|---|---|---|---|
| 1 | ROW DIRECTION ACCESS MODE (00) | 0 | 0 | 0 | 0 | 4A | 4B | 4C | 4D |
| 2 | | 1 | 0 | 0 | 0 | 4B | 4C | 4D | 4A |
| 3 | | 0 | 1 | 0 | 0 | 4C | 4D | 4A | 4B |
| 4 | | 1 | 1 | 0 | 0 | 4D | 4A | 4D | 4C |
| 5 | | 0 | 0 | 1 | 0 | 4C | 4D | 4A | 4B |
| 6 | | 1 | 0 | 1 | 0 | 4D | 4A | 4B | 4C |
| 7 | | 0 | 1 | 1 | 0 | 4A | 4B | 4C | 4D |
| 8 | | 1 | 1 | 1 | 0 | 4B | 4C | 4D | 4A |
| 9 | | 0 | 0 | 0 | 1 | 4B | 4A | 4D | 4C |
| 10 | | 1 | 0 | 0 | 1 | 4A | 4D | 4C | 4B |
| 11 | | 0 | 1 | 0 | 1 | 4D | 4C | 4B | 4A |
| 12 | | 1 | 1 | 0 | 1 | 4C | 4B | 4A | 4D |
| 13 | | 0 | 0 | 1 | 1 | 4D | 4C | 4B | 4A |
| 14 | | 1 | 0 | 1 | 1 | 4C | 4B | 4A | 4D |
| 15 | | 0 | 1 | 1 | 1 | 4B | 4A | 4D | 4C |
| 16 | | 1 | 1 | 1 | 1 | 4A | 4D | 4C | 4B |
| 17 | COLUMN DIRECTION ACCESS MODE (01) | 0 | 0 | 0 | 0 | 4A | 4C | 4B | 4D |
| 18 | | 1 | 0 | 0 | 0 | 4B | 4D | 4A | 4C |
| 19 | | 0 | 1 | 0 | 0 | 4C | 4A | 4D | 4B |
| 20 | | 1 | 1 | 0 | 0 | 4D | 4B | 4C | 4A |
| 21 | | 0 | 0 | 1 | 0 | 4C | 4B | 4D | 4A |
| 22 | | 1 | 0 | 1 | 0 | 4D | 4A | 4C | 4D |
| 23 | | 0 | 1 | 1 | 0 | 4A | 4D | 4B | 4C |
| 24 | | 1 | 1 | 1 | 0 | 4B | 4C | 4A | 4D |
| 25 | | 0 | 0 | 0 | 1 | 4B | 4D | 4A | 4C |
| 26 | | 1 | 0 | 0 | 1 | 4A | 4C | 4B | 4D |
| 27 | | 0 | 1 | 0 | 1 | 4D | 4B | 4A | 4C |
| 28 | | 1 | 1 | 0 | 1 | 4C | 4A | 4D | 4B |
| 29 | | 0 | 0 | 1 | 1 | 4D | 4A | 4C | 4B |
| 30 | | 1 | 0 | 1 | 1 | 4C | 4B | 4D | 4A |
| 31 | | 0 | 1 | 1 | 1 | 4B | 4C | 4A | 4D |
| 32 | | 1 | 1 | 1 | 1 | 4A | 4D | 4B | 4C |
| 33 | COLUMN DIRECTION TWO STAGE ACCESS MODE 16bit×2 (10) | 0 | 0 | 0 | 0 | 4A | 4B | 4C | 4D |
| 34 | | 0 | 1 | 0 | 0 | 4C | 4D | 4A | 4B |
| 35 | | 0 | 0 | 1 | 0 | 4C | 4D | 4B | 4A |
| 36 | | 0 | 1 | 1 | 0 | 4A | 4B | 4D | 4C |
| 37 | | 0 | 0 | 0 | 1 | 4B | 4A | 4D | 4C |
| 38 | | 0 | 1 | 0 | 1 | 4D | 4C | 4B | 4A |
| 39 | | 0 | 0 | 1 | 1 | 4D | 4C | 4A | 4B |
| 40 | | 0 | 1 | 1 | 1 | 4B | 4A | 4C | 4D |
| 41 | STAGGERED MODE (11) | 0 | 0 | 0 | 0 | 4A | 4C | 4B | 4D |
| 42 | | 1 | 0 | 0 | 0 | 4B | 4D | 4A | 4C |
| 43 | | 0 | 1 | 1 | 0 | 4C | 4A | 4D | 4B |
| 44 | | 1 | 1 | 1 | 0 | 4D | 4B | 4C | 4A |

| READING ACCESS MODE | READING ADDRESS | | | | MEMORY4A | | MEMORY4B | | MEMORY4C | | MEMORY4D | |
|---|---|---|---|---|---|---|---|---|---|---|---|---|
| | A0 | A1 | A4 | A5 | a0 | a1 | a0 | a1 | a0 | a1 | a0 | a1 |
| ROW DIRECTION ACCESS MODE | — | — | 0 | 0 | 0 | 0 | 0 | 0 | 0 | 0 | 0 | 0 |
| | — | — | 1 | 0 | 1 | 0 | 1 | 0 | 1 | 0 | 1 | 0 |
| | — | — | 0 | 1 | 0 | 1 | 0 | 1 | 0 | 1 | 0 | 1 |
| | — | — | 1 | 1 | 1 | 1 | 1 | 1 | 1 | 1 | 1 | 1 |
| COLUMN DIRECTION ACCESS MODE | 0 | 0 | — | — | 0 | 0 | 0 | 1 | 1 | 0 | 1 | 1 |
| | 1 | 0 | — | — | 0 | 1 | 0 | 0 | 1 | 1 | 1 | 0 |
| | 0 | 1 | — | — | 1 | 0 | 1 | 1 | 0 | 0 | 0 | 1 |
| | 1 | 1 | — | — | 1 | 1 | 1 | 0 | 0 | 1 | 1 | 1 |
| COLUMN DIRECTION TWO STAGE ACCESS MODE (16bit×2) | 0 | 0 | 0 | 0 | 0 | 0 | 0 | 0 | 1 | 0 | 1 | 0 |
| | 0 | 0 | 1 | 0 | 0 | 1 | 0 | 1 | 1 | 0 | 1 | 0 |
| | 0 | 0 | 0 | 1 | 0 | 1 | 0 | 1 | 1 | 1 | 1 | 1 |
| | 0 | 0 | 1 | 1 | 0 | 0 | 0 | 0 | 1 | 1 | 1 | 1 |
| | 0 | 1 | 0 | 0 | 1 | 0 | 1 | 0 | 0 | 0 | 0 | 0 |
| | 0 | 1 | 1 | 0 | 1 | 0 | 1 | 0 | 0 | 1 | 0 | 1 |
| | 0 | 1 | 0 | 1 | 1 | 1 | 1 | 1 | 0 | 1 | 0 | 1 |
| | 0 | 1 | 1 | 1 | 1 | 1 | 1 | 1 | 0 | 0 | 0 | 0 |
| STAGGERED MODE | 0 | 0 | 0 | 0 | 0 | 0 | 0 | 1 | 0 | 0 | 0 | 1 |
| | 1 | 0 | 0 | 0 | 0 | 1 | 0 | 0 | 0 | 1 | 0 | 0 |
| | 0 | 1 | 1 | 0 | 1 | 0 | 1 | 1 | 1 | 0 | 1 | 1 |
| | 1 | 1 | 1 | 0 | 1 | 1 | 1 | 0 | 1 | 1 | 1 | 0 |

METHOD OF USING MEMORY, TWO DIMENSIONAL DATA ACCESS MEMORY AND OPERATION PROCESSING APPARATUS

BACKGROUND OF THE INVENTION

1. Field of the Invention

The present invention relates to a method of using a memory in which an efficient SIMD (Single Instruction stream Multiple Data stream) operation can be implemented, a two dimensional access memory embodied as an instrument with this method of using the memory, and an operation processing apparatus that can perform the SIMD operation efficiently employing the two dimensional data access memory.

2. Description of the Related Art

The SIMD operation is involved in having a plurality of processors and processing plural pieces of data on the same instruction. Therefore, the SIMD operation is very efficient to perform the parallel operation by taking out a partial row of continuous data from one dimensional row of data stored in memory.

However, when the data to be operated is not stored continuously in the memory, or the operation result is to be arranged discretely at predetermined locations in the memory, it is required to have a processing for preparing for the data subject to parallel operation and a processing for arranging the parallel operation result at predetermined locations in the memory. Therefore, there is the disadvantage that the intrinsic parallel operation may be hampered.

By the way, a technique for speeding up the two dimensional discrete cosine conversion with the SIMD processing was described in Japanese Patent Laid-Open No. 2000-69478.

With this technique, the image data arranged in a scanning order is rearranged in the order suitable for executing a butterfly operation in the conversion encoding operation through the SIMD processing, the rearranged result being stored in the memory, and the image data stored in the memory is subjected to two dimensional cosine conversion.

However, in the technique as described in the above-cited patent, an operation for rearranging the image data is required, and when implemented in hardware, a circuit involving rearranging operation is needed, resulting in the larger circuit scale and the increased consumption power due to the memory access for the rearranging operation.

SUMMARY OF THE INVENTION

In the light of the above problems, it is a first object of the present invention to provide a method of using a memory that can contribute to making the SIMD operation more efficient.

Also, it is a second object of the invention to provide a two dimensional data access memory that can implement the efficient SIMD operation by allowing access to continuous or discontinuous data arranged in the transverse or longitudinal direction from a designated position in a two dimensional memory space.

Further, it is a third object of the invention to provide an operation processing apparatus that can perform the SIMD operation efficiently by utilizing a two dimensional data access memory.

To solve the above problems and attain the first object, according to the invention as set forth in claim 1, there is provided a method of using a memory, comprising the steps of: supposing a predefined two dimensional memory space consisting of predefined virtual minimum two dimensional memory spaces formed two-dimensionally arranged in longitudinal and transverse directions; preassigning each address of said virtual minimum two dimensional memory space to a predetermined address in each of n physical memories determined in relation with said virtual minimum two dimensional memory space; designating the reading address in said virtual minimum two dimensional memory space, at the time of reading data in said two dimensional memory space; and designating the data reading pattern as the transverse direction or longitudinal direction of data with reference to the designated reading address, whereby the continuous data arranged in the transverse or longitudinal direction in the virtual minimum two dimensional memory space is read in accordance with the designated address and the designated direction from a corresponding address in each of the n physical memories.

According to a second aspect of the invention as set forth in claim 2, there is provided the method of using the memory as set forth in claim 1, wherein when writing the data into the two dimensional memory space, the writing address is designated in the virtual minimum two dimensional memory space, and the writing direction is designated as the transverse direction or longitudinal direction of data with reference to the designated writing address, whereby the continuous data to be written continuously in the transverse or longitudinal direction in the virtual minimum two dimensional memory space is written in accordance with the designated address and the designated direction at a corresponding address in each of the n physical memories.

According to the invention as set forth in claim 3, there is provided a method of using a memory, comprising the steps of: supposing a predefined two dimensional memory space consisting of predefined virtual minimum two dimensional memory spaces formed two-dimensionally arranged in longitudinal and transverse directions; preassigning each address of said virtual minimum two dimensional memory space to a predetermined address in each of n physical memories determined in relation with said virtual minimum two dimensional memory space; designating the reading address in said virtual minimum two dimensional memory space, at the time of reading data in said two dimensional memory space; and designating a predetermined reading pattern (e.g., a staggered mode pattern as shown in FIG. 19 or FIG. 20) with reference to the designated reading address, whereby a predetermined data in the virtual minimum two dimensional memory space is read in accordance with the designated address and the designated pattern from a corresponding address in each of the n physical memories.

According to the invention as set forth in claim 4, there is provided the method of using the memory as set forth in claim 1 or claim 3, wherein apart of the reference data (e.g., a reference frame of FIG. 31) in estimating a movement vector of a moving picture is stored in the two dimensional memory space, and when reading the data in the two dimensional memory space, a reading mode (e.g., a circular mode in the second embodiment) of reading predetermined data in estimating the movement vector is further designated, whereby the succeeding reference data is written successively into the virtual minimum two dimensional memory space where the data has been already read in estimating the movement vector, or the data is read by modifying the reading address of the data to a predetermined address in the virtual minimum two dimensional memory space where the succeeding reference data is written, if the data is referred to across the periphery of the two dimensional memory space (e.g., the boundary of storage area in the two dimensional memory space 3 of FIG. 15), in accordance with the reading address, the reading direction of data that is the transverse or longitudinal direction as set forth in claim 1 or the reading pattern of data, and the reading mode of data as set forth in claim 3.

According to the invention as set forth in claim 5, there is provided the method of using the memory, wherein a part of the reference data in estimating the movement vector of the moving picture is stored in the two dimensional memory space, and at the time of reading the data in the two dimensional memory space, the reading mode (e.g., a padding mode in the second embodiment) of predetermined data in estimating the movement vector is further designated, whereby the data is read by modifying the reading address of the data that is not contained in an existence range of the reference data (e.g., a range in which the data of reference frame of FIG. 18 exists) to the address of predetermined data located on the periphery of the existence range of the reference data, if the data is referred to across the periphery (e.g., the image boundary of FIG. 18) of the existence range of the reference data, in accordance with the reading address, the reading direction of data that is the transverse or longitudinal direction as set forth in claim 1 or the reading pattern of data, and the reading mode of data as set forth in claim 3.

With the constitution according to the invention as set forth in claims 1 to 5, the SIMD operation can be performed more efficiently.

Also, with the constitution according to the invention as set forth in claims 3 to 5, the processing for estimating the movement vector of moving picture can be performed more efficiently.

To attain the second object of the invention, according to the invention as set forth in claim 6, there is provided a two dimensional data access memory having n physical memories supposing a two dimensional memory space consisting of predefined virtual minimum two dimensional memory spaces formed two-dimensionally arranged in the longitudinal and transverse directions, with each address of the virtual minimum two dimensional memory space respectively being preassigned in a certain rule, the two dimensional data access memory comprising a read data control section for designating an access location in the virtual minimum two dimensional memory space, rearranging the pieces of the read data from the n physical memories in accordance with the reading direction for reading the data from the specified access location or a reading access mode for designating the pattern, and outputting the pieces of rearranged read data collectively at the time of reading the data in the two dimensional memory space, and a reading address control section for modifying the designated reading address to a predetermined address and outputting it to the n memories in accordance with the designated reading access mode and the specified access location, or in accordance with the designated reading access mode if the access space extends over the adjacent virtual minimum two dimensional memory spaces at the time of designating the reading address.

According to the invention as set forth in claim 7, there is provided the two dimensional data access memory as set forth in claim 6, wherein the read data control section comprises a data controller for outputting a selection signal for selecting the read data in the n physical memories in accordance with an access location in the virtual minimum two dimensional memory space that is specified in accordance with a designation of the reading address, and in accordance with a designation of the reading access mode, when reading the data, and n selectors, provided corresponding to the n physical memories, for selecting each of the read data from the n physical memories to output it at the same time on the basis of the selection signal from the data controller, and the reading address control section comprises an address controller for outputting an address conversion signal for converting the reading address corresponding to the lower address in each of the n physical memories to a predetermined value in accordance with the reading access mode and the reading address, or outputting a correction signal for correcting the reading address corresponding to the upper address in each of the n physical memories in accordance with the reading access mode if the access space extends over the adjacent virtual minimum two dimensional memory spaces, when designating the reading address, and n address correcting sections, provided corresponding to the n physical memories, for converting the reading address to a predetermined value upon the address conversion signal from the address controller to output it to each of the n physical memories, and correcting the reading address upon the correction signal from the address controller to output it to each of the n physical memories.

According to the invention as set forth in claim 8, there is provided the two dimensional data access memory as set forth in claim 6, wherein the read data control section rearranges the pieces of read data from the n physical memories in accordance with an option mode (e.g., a circular mode or padding mode in the second embodiment) for designating the data reading mode in estimating the movement vector, in addition to the designated reading access mode and the specified access location, and outputs the rearranged read data collectively, and the reading address control section modifies the designated reading address to a predetermined address to output it to the n physical memories in accordance with the designated reading access mode and the specified access location, or in accordance with the designated reading access mode if the access space extends over the adjacent virtual minimum two dimensional memory space, or in accordance with the reading access mode and the option mode if the access space extends across the periphery of the two dimensional memory space (e.g., the boundary of storage area in the two dimensional memory space 3 of FIG. 15) at the time of designating the reading address.

According to the invention as set forth in claim 9, there is provided the two dimensional data access memory as set forth in claim 8, wherein the read data control section comprises a data controller for outputting a selection signal for selecting the read data in the n physical memories in accordance with an access location in the virtual minimum two dimensional memory space specified in accordance with a designation of the reading address, and a designation of the reading access mode and a designation of the option mode (e.g., circular mode in the second embodiment), when reading the data, and n selectors, provided corresponding to the n physical memories, for selecting each of the read data from the n physical memories to output it at the same time on the basis of the selection signal from the data controller, and the reading address control section comprises an address controller for outputting an address conversion signal for converting the reading address corresponding to the lower address in each of the n physical memory to a predetermined value in accordance with the reading access mode and the reading address, or outputting a correction signal for correcting the reading address corresponding to the upper address in each of the n physical memories in accordance with the reading access mode if the access space extends over the adjacent virtual minimum two dimensional memory spaces, or outputting a correction signal for correcting the upper address in each of the n physical memories in accordance with the reading access mode and the option mode if the access space extends across the periphery of the two dimensional memory space (e.g., the boundary of storage area in the two dimensional memory space 3 of FIG. 15), when designating the reading address, and n address correcting sections, provided corresponding to the n physical memories, for converting the reading address to a predetermined value upon the address conversion signal from the address controller to output it to each of the n physical memories, and correcting the reading address upon the correction signal from the address controller to output it to each of the n physical memories.

According to the invention as set forth in claim 10, there is provided the two dimensional data access memory as set forth in claim 8, wherein the read data control section comprises a data controller for outputting a selection signal for selecting the read data in the n memories in accordance with an access location in the virtual minimum two dimensional memory space specified in accordance with a designation of the reading address, and a designation of the reading access mode and a designation of the option mode (e.g., padding mode in the second embodiment), when reading the data, and n selectors, provided corresponding to the n physical memories, for selecting each of the read data from the n physical memories to output it at the same time on the basis of the selection signal from the data controller, and the reading address control section comprises an address controller for outputting an address conversion signal for converting the reading address corresponding to the lower address in each of the n physical memories to a predetermined value in accordance with the reading access mode and the reading address, or outputting a correction signal for correcting the reading address corresponding to the upper address in each of the n physical memories in accordance with the reading access mode if the access space extends over the adjacent virtual minimum two dimensional memory spaces, or outputting a correction signal for correcting the upper address and the lower address in each of the n physical memories in accordance with the reading access mode and the option mode if the access space extends across the periphery of an existence range of data stored in the two dimensional memory space, when designating the reading address, and n address correcting sections, provided corresponding to the n physical memories, for converting the reading address to a predetermined value upon the address conversion signal from the address controller to output it to each of then physical memories, and correcting the reading address upon the correction signal from the address controller to output it to each of the n physical memories.

Further, according to the invention as set forth in claim 11, there is provided the two dimensional data access memory as set forth in claim 6 or claim 7, further comprising a write data control section for specifying an access location in the virtual minimum two dimensional memory space, rearranging the pieces of write data into the n physical memories in accordance with a write access mode designating the writing direction of data from the specified access location, and supplying the rearranged pieces of write data to the n physical memories collectively at the time of writing the data, and a writing address control section for modifying the designated writing address to a predetermined address to output it to each of the n physical memories in accordance with the designated writing access mode and the specified access location, or in accordance with the designated writing access mode if the access space extends over the adjacent virtual minimum two dimensional memory spaces at the time of designating the writing address.

Also, according to the invention as set forth in claim 12, there is provided the two dimensional data access memory as set forth in claim 5, wherein the write data control section comprises a data controller for outputting a selection signal for selecting the write data into the n physical memories in accordance with an access location in the virtual minimum two dimensional memory space specified with a designation of the writing address, and in accordance with a designation of the writing access mode, when writing the data, and n selectors, provided corresponding to the n physical memories, for selecting each piece of the write data into the n physical memories to supply it to each of the n physical memories at the same time on the basis of the selection signal from the data controller, and the writing address control section comprises an address controller for outputting an address conversion signal for converting the writing address corresponding to the lower address in each of the n physical memories to a predetermined value in accordance with the writing access mode and the writing address, or outputting a correction signal for correcting the writing address corresponding to the upper address in each of the n physical memories in accordance with the writing access mode if the access space extends over the adjacent virtual minimum two dimensional memory spaces, when designating the writing address, and n address correcting sections, provided corresponding to the n physical memories, for converting the writing address to a predetermined value upon the address conversion signal from the address controller to output it to each of the n physical memories, and correcting the writing address upon the correction signal from the address controller to output it to each of the n physical memories.

With the constitution according to the invention as set forth in claims 6 to 10, the continuous data arranged in the transverse or longitudinal direction from the designated location in the two dimensional memory space can be read from the physical memories at the same time, thereby making the SIMD operation more efficient.

With the constitution according to the invention as set forth in claims 11 and 12, the continuous data arranged in the transverse or longitudinal direction from the designated location in the two dimensional memory space can be read from the physical memories at the same time, and can be written into the physical memories at the same time so that the data may be arranged continuously in the transverse or longitudinal direction from the designated location in the two dimensional memory space, there by making the SIMD operation more efficient.

With the constitution according to the invention as set forth in claims 8 to 10, the processing for estimating the movement vector of moving picture can be performed more efficiently.

Furthermore, to attain the third object of the invention, according to the invention as set forth in claim 13, there is provided an operation processing apparatus comprising two dimensional data access memory as set forth in any one of claim 6, claim 7, claim 11 or claim 12, and an SIMD type processor for performing the SIMD process by designating the address in the two dimensional data access memory in accordance with a predetermined arithmetic operation, as well as the access mode, and reading the predetermined data from the two dimensional data access memory.

According to the invention as set forth in claim 14, there is provided the operation processing apparatus as set forth in claim 13, wherein the predetermined operation is two dimensional discrete cosine conversion.

Further, according to the invention as set forth in claim 15, there is provided an operation processing apparatus, further comprising two dimensional data access memory as set forth in any one of claims 8 to 10, and an SIMD type processor for performing the SIMD process by designating the address in the two dimensional data access memory in accordance with a predetermined arithmetic operation, as well as the access mode and the option mode, and reading the predetermine data from the two dimensional data access memory.

Also, according to the invention as set forth in claim 16, there is provided the operation processing apparatus as set forth in claim 15, wherein the predetermined operation is an operation process involving estimating the movement vector of moving picture.

With the constitution according to the invention as set forth in claim 13 and claim 16, the SIMD operation can be performed efficiently by employing the two dimensional data access memory.

BRIEF DESCRIPTION OF THE DRAWINGS

FIG. 1 is a diagram showing one example of a virtual minimum two dimensional memory space;

FIG. 2 is a diagram showing how to map the virtual minimum two dimensional memory space into physical memories;

FIG. 8 is a diagram showing which memory output each selector selects in accordance with a reading address and a reading access mode;

FIG. 9 is a diagram showing conversion examples of the reading address;

FIG. 10 is a diagram showing correction examples of the reading address;

FIG. 19 is a diagram showing one example of a data reading pattern in a staggered mode;

FIG. 20 is a diagram showing the data reading order in the staggered mode;

FIG. 21 is a graph showing a relation between the number of executing block matching and a threshold for accumulated residual;

FIG. 24 is a diagram showing the address corrected values for an upper third and following bits when a row direction access mode is designated in a circular mode;

FIG. 25 is a diagram showing the address corrected values for the upper third and following bits when a column direction access mode and a column direction two stage access mode are designated in the circular mode;

FIG. 26 is a diagram showing which memory output each selector selects in the padding mode;

FIG. 27 is a diagram showing which memory output each selector selects in the staggered mode;

DETAILED DESCRIPTION OF THE PREFERRED EMBODIMENTS (First embodiment)

A first embodiment of a method of using a memory according to the present invention will be described below by reference to the accompanying drawings. With this method of using the memory according to this embodiment, a virtual minimum two dimensional memory space 1 is defined as shown in FIG. 1, and will be first set forth.

The virtual minimum two dimensional memory space 1 has four virtual storage elements 2 of minimum unit capable of memorizing one byte (eight bits) arranged in each of the longitudinal and transverse directions, or a total of 16 virtual storage elements 2, as shown in FIG. 1. Accordingly, the virtual minimum two dimensional memory space 1 is constituted of 4 bytes×4 bytes=16 bytes in this example. The size of the virtual minimum two dimensional memory space 1 may be 8 bytes×8 bytes=64 bytes, besides 16 bytes as above.

This virtual minimum two dimensional memory space 1 is physically mapped into four physical memories 4A to 4D, as shown in FIG. 2. Namely, one virtual minimum two dimensional memory space 1 corresponds to four-byte continuous areas starting from the same address in four physical memories 4A to 4D. More specifically, each address $a_{n(0)}$, $b_{n(0)}$, $c_{n(0)}$, $d_{n(0)}$, . . . in the virtual minimum two dimensional memory space 1 as shown in FIG. 1 is preassigned to predetermined address $a_{n(0)}$, $b_{n(0)}$, $c_{n(0)}$, $d_{n(0)}$, . . . in the physical memories 4A to 4D, for example.

Figure 3:
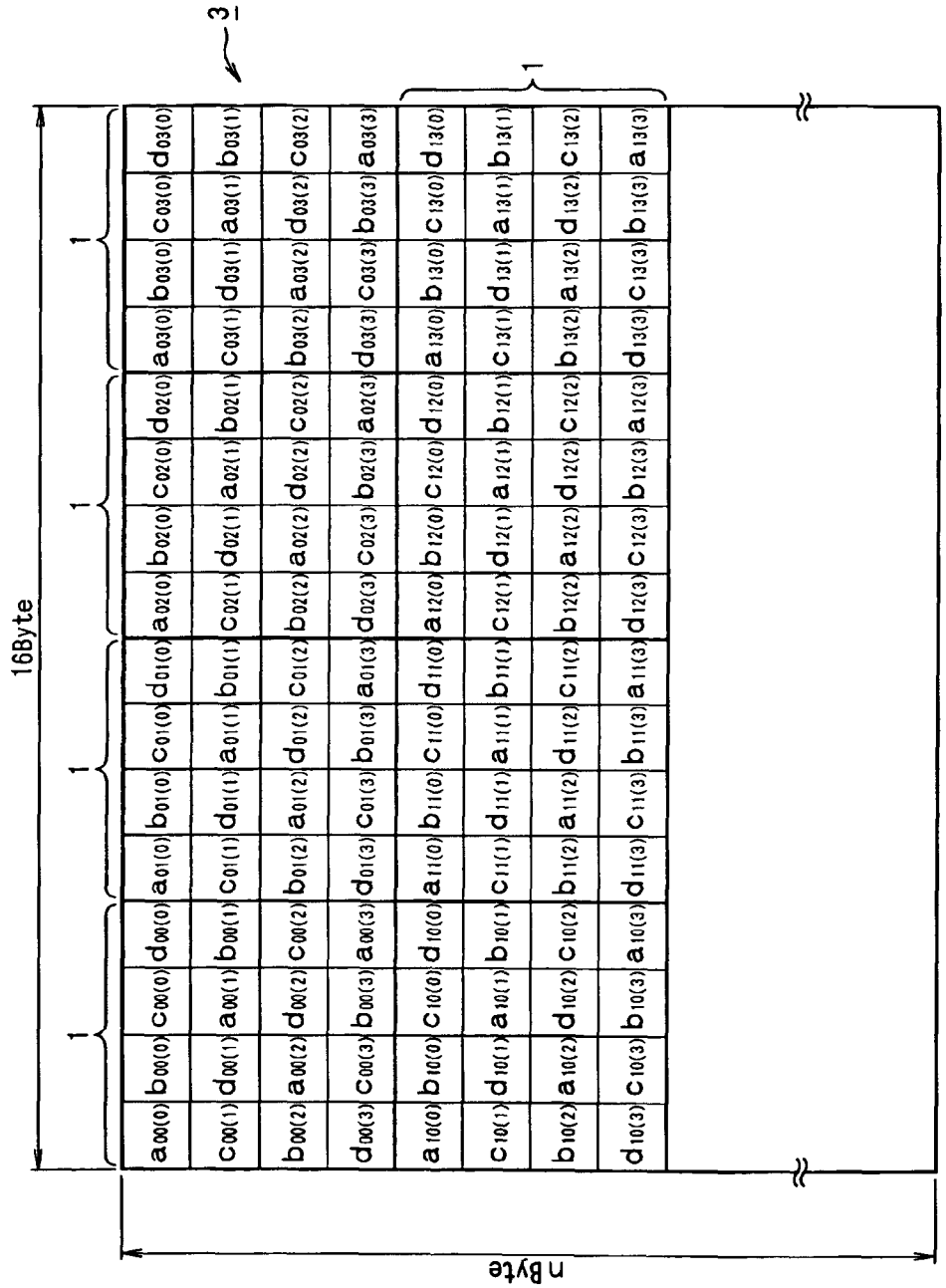
FIG. 3 is a diagram showing one example of a two dimensional memory space formed on the basis of the virtual minimum two dimensional memory space.

With this method of using the memory according to this embodiment, a two dimensional memory space 3 is supposed, as shown in FIG. 3, and will be described below.

The two dimensional memory space 3 has virtual minimum two dimensional memory spaces 1 arranged side by side, like tiles, in the transverse and longitudinal directions, as shown in FIG. 3. In this two dimensional memory space 3, the number of arranging virtual minimum two dimensional memory spaces 1 in the transverse direction can be set up at will so far as it is a power of 2, and is 16 bytes×n bytes in the example of FIG. 3.

Next, referring now to FIGS. 1 to 4, the method of using the memory according to this embodiment will be described below.

First of all, the two dimensional memory space 3 is supposed in which the virtual minimum two dimensional memory spaces 1 as shown in FIG. 1 are arranged side by side, like tiles, in the longitudinal and transverse directions as shown in FIG. 3.

On one hand, each address of the virtual minimum two dimensional memory space 1 is preassigned (associated) to predetermined address in each of four physical memories 4A to 4D that is determined in relation with the size of virtual minimum two dimensional memory space 1 (see FIGS. 1 and 2).

The reading operation from the physical memories 4A to 4D will be described below to read the continuous data from any address in the virtual minimum two dimensional memory space 1.

In this case, any reading address, and the reading access mode for designating the reading direction of data are designated.

These reading access modes include a row direction access mode, a column direction access mode, and a row direction two stage access mode.

Figure 4:
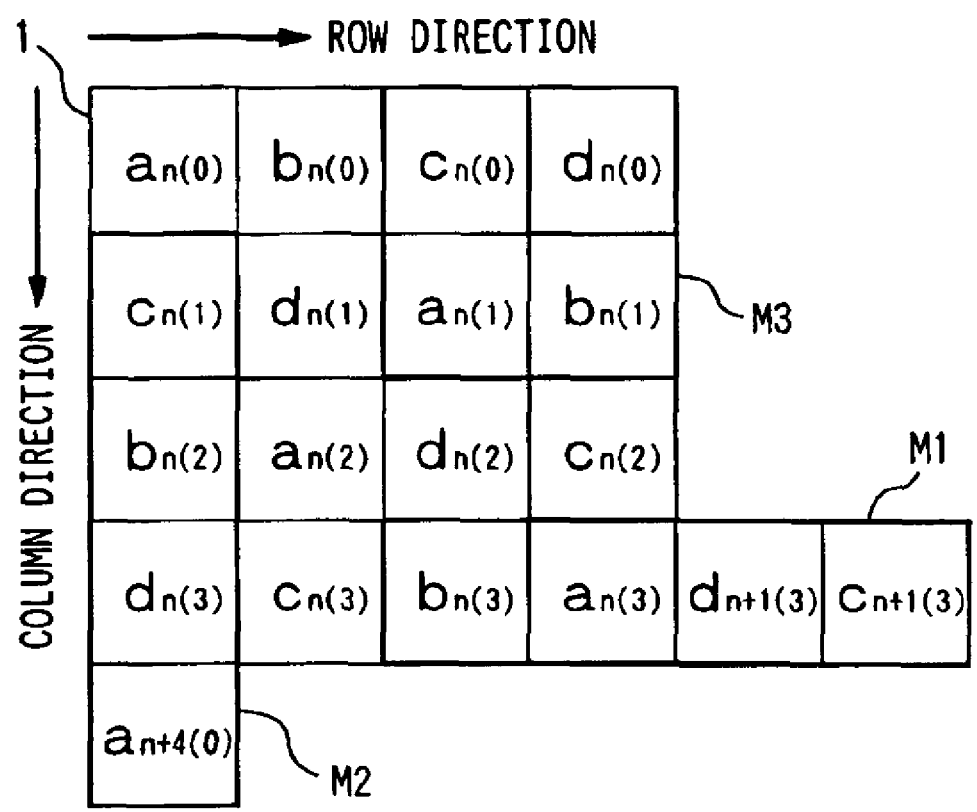
FIG. 4 is a diagram for explaining an access mode.

The row direction access mode involves reading the data from any reading address in the virtual minimum two dimensional memory space 1 in the row direction (transverse direction), such as 8 bits×4, 16 bits×2, 32 bits×1, as indicated at M1 in FIG. 4, in which it can be thought that there are sixteen ways of access.

The column direction access mode involves reading the data from any reading address in the virtual minimum two dimensional memory space 1 in the column direction (longitudinal direction), such as 8 bits×4, as indicated at M2 in FIG. 4, in which it can be thought that there are sixteen ways of access.

The row direction two stage access mode involves reading the data from any reading address in the virtual minimum two dimensional memory space 1 at two stages in the row direction, such as 16 bits×2, as indicated at M3 in FIG. 4, in which it can be thought that there are eight ways of access. In this mode, access is limited only to units of two bytes in the row direction.

In this way, if any reading address in the virtual minimum two dimensional memory space 1 is designated, and the reading access mode is designated, each corresponding address in each of the physical memories 4A to 4D is designated in accordance with the designated reading address and the designated reading access mode, whereby the data is read and the read data is output at the same time.

For example, if address $c_{n(0)}$ is designated in the virtual minimum two dimensional memory space 1, and the row direction two stage access mode is designated as indicated at M3 in FIG. 4, address $a_{n(1)}$ is designated in memory 4A, address $b_{n(1)}$ is designated in memory 4B, address $c_{n(0)}$ is designated in memory 4C, and address $d_{n(0)}$ is designated in memory 4D, whereby each data is read at the same time.

The writing operation into the physical memories 4A to 4D will be described below in writing the data at any address in the virtual minimum two dimensional memory space 1 at the same time.

In this case, any writing address is designated, and the writing access mode for designating the writing direction of data is designated. Thus, each corresponding address in each of the physical memories 4A to 4D is designated in accordance with the designated writing address and the designated writing access mode, whereby the data is writable, and the write data is written at each address at the same time.

For example, if address $c_{n(0)}$ is designated in the virtual minimum two dimensional memory space 1, and the row direction two stage access mode is designated as indicated at M3 in FIG. 4, address $a_{n(1)}$ is designated in memory 4A, address $b_{n(1)}$ is designated in memory 4B, address $c_{n(0)}$ is designated in memory 4C and address $d_{n(0)}$ is designated in memory 4D, whereby the data is writable, and each data is written at the same time.

As described above, with the method of using the memory according to this embodiment, if any access location in the two dimensional memory space 3 and the access mode are designated, the continuous data in the transverse or longitudinal direction from any access location in the two dimensional memory space 3 can be read or written from or into each of the physical memories 4A to 4D at the same time in accordance with the designated access location and the designated access mode. Therefore, the method of using the memory according to this embodiment can contribute to the higher efficiency of the SIMD operation.

Figure 5:
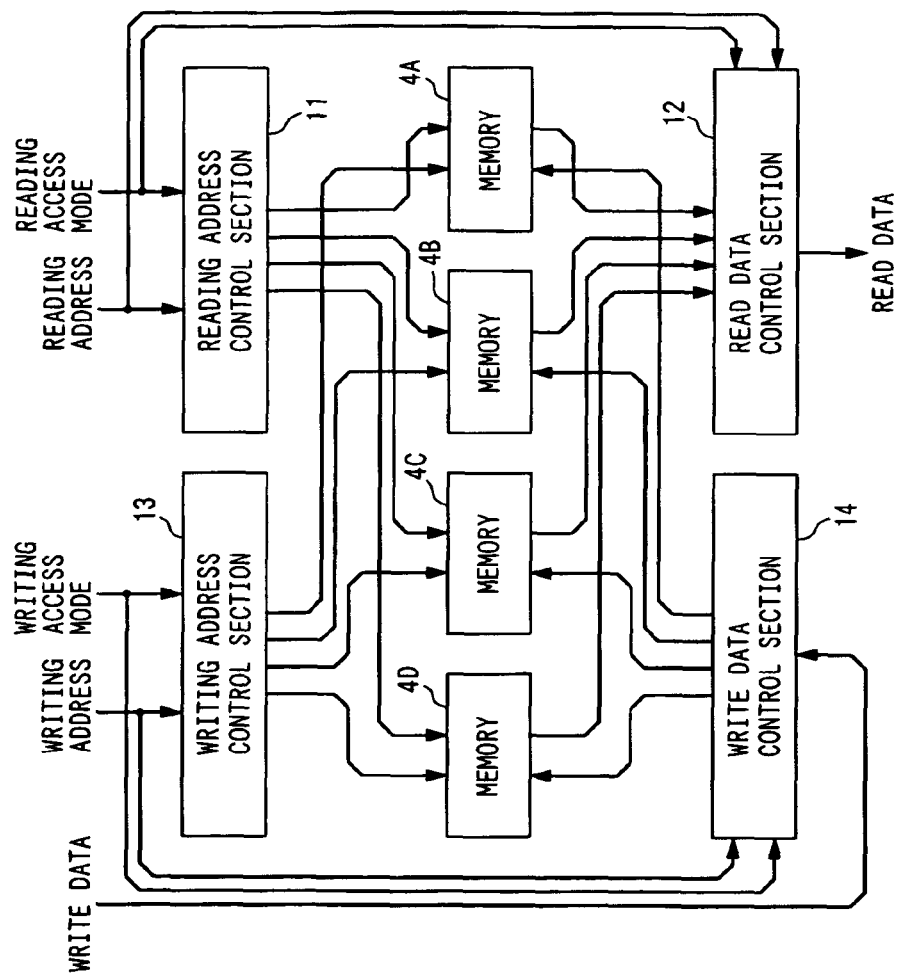
FIG. 5 is a block diagram showing a configuration of a two dimensional data access memory according to a first embodiment of the invention.
Figure 6:
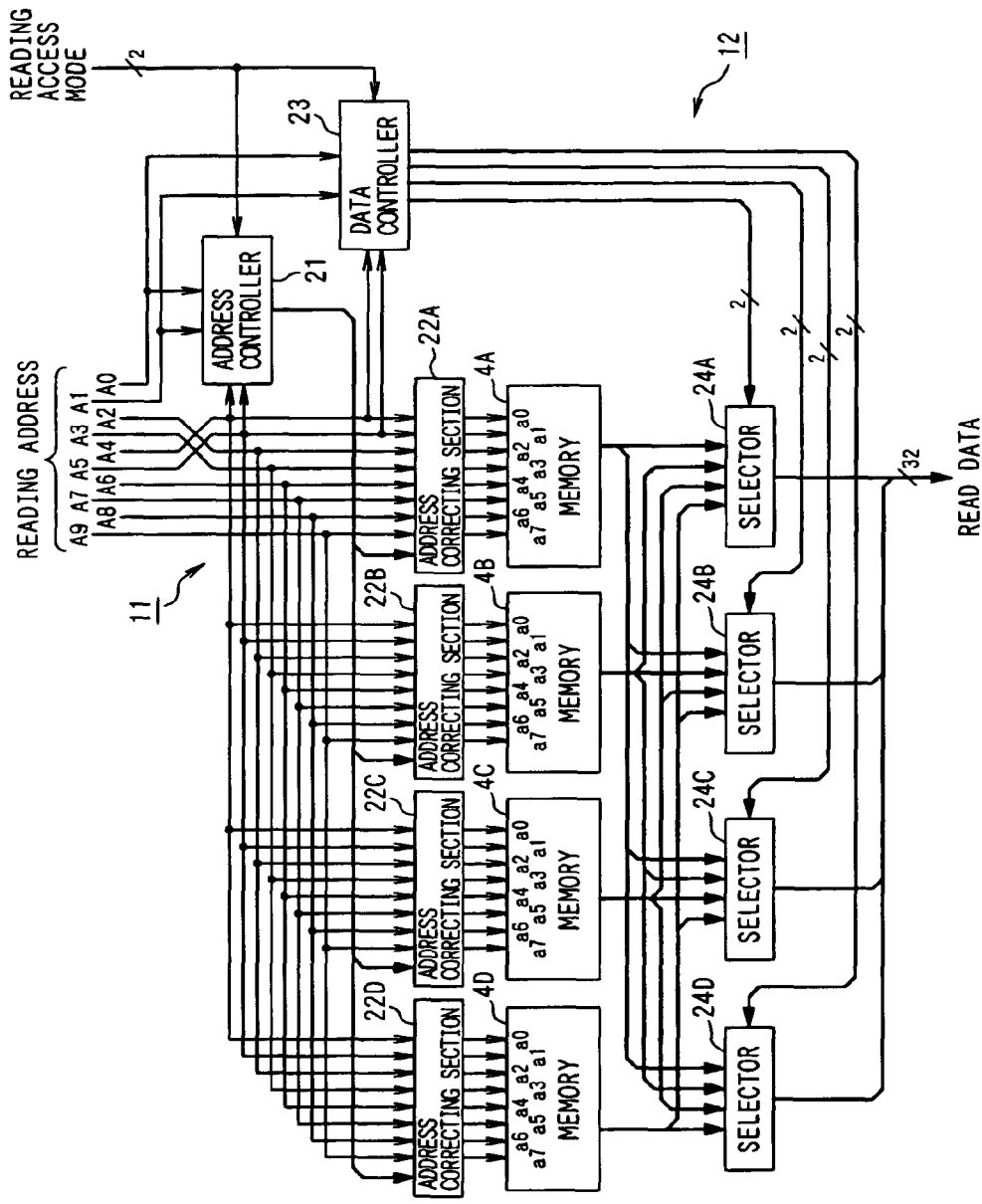
FIG. 6 is a block diagram showing a configuration of a reading address control section and a read data control section as shown in FIG. 5.
Figure 7:
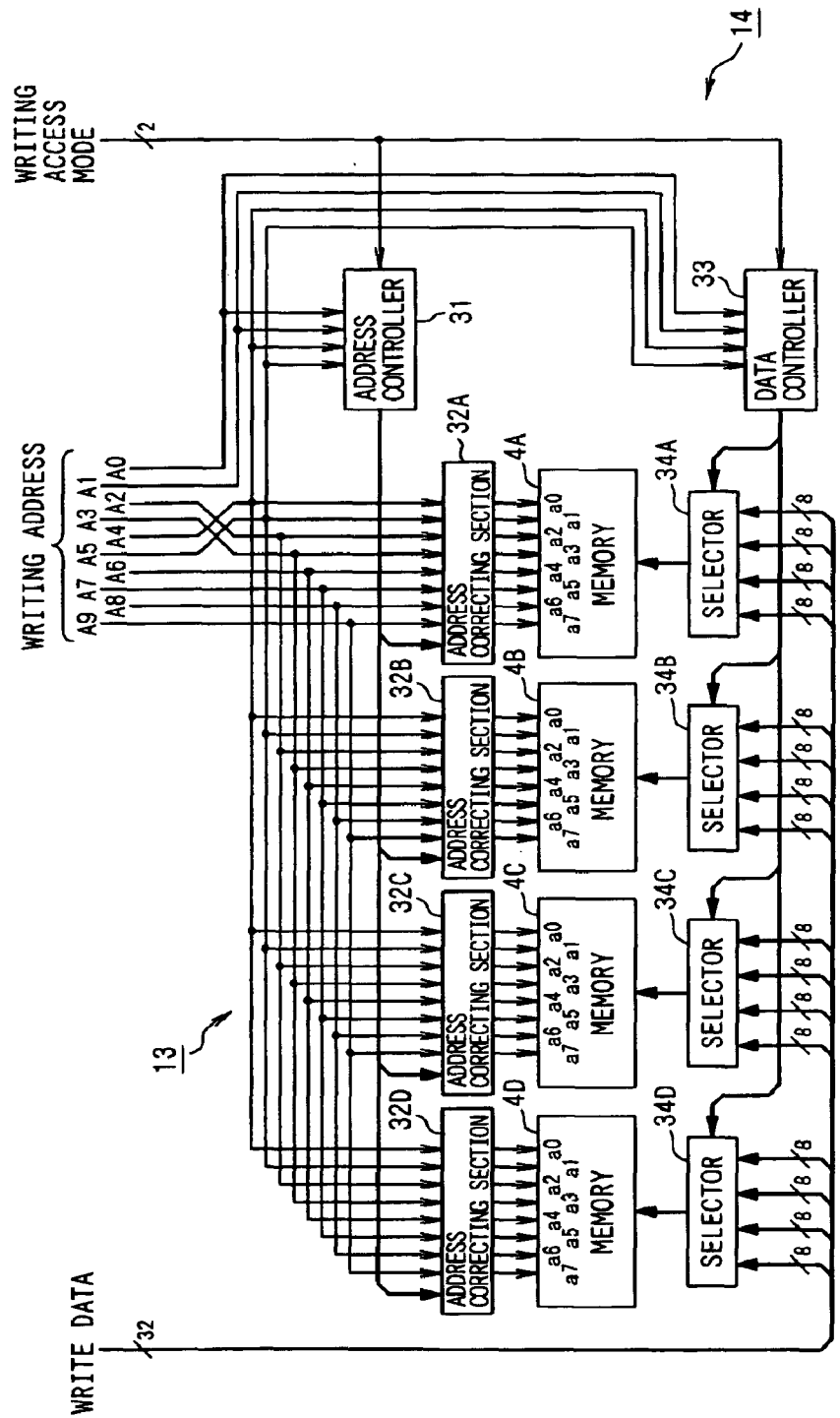
FIG. 7 is a block diagram showing a configuration of a writing address control section and a write data control section as shown in FIG. 5.

Referring now to FIGS. 5 to 7, the configuration of the two dimensional data access memory of the invention will be described below.

The two dimensional data access memory 10 according to this embodiment embodies the method of using the memory according to this embodiment. As shown in FIG. 5, it comprises the memories 4A to 4D, a reading address control section 11, a read data control section 12, a writing address control section 13, and a write data control section 14. And the reading address control section 11 and the read data control section 12 constitutes a data reading system, and the writing address control section 13 and the write data control section 14 constitutes a data writing system, in which these two systems share the memories 4A to 4D.

The two dimensional memory space 3 is supposed in which the virtual minimum two dimensional memory spaces 1 as shown in FIG. 1 are arranged in the longitudinal and transverse directions as shown in FIG. 3, each address in the virtual minimum two dimensional memory space 1 being assigned in a certain rule to a predetermined address in each of the physical memories 4A to 4D, as shown in FIG. 2.

The reading address control section 11 converts a predetermined part of the reading address into a predetermined value in accordance with a designation of the reading access mode to output it to the each of the physical memories 4A to 4D, or corrects the other part of the reading address in accordance with the designated reading access mode to output it to the memories 4A to 4D if the access space extends over the adjacent virtual minimum two dimensional memory spaces 1 (see FIGS. 3 and 4), when designating the reading address.

The read data control section 12 specifies the reading address in the virtual minimum two dimensional memory space 1 on the basis of apart of the reading address, and rearranges the pieces of read data from the memories 4A to 4D in accordance with the specified reading address and the designated reading access mode to output the rearranged read data at the same time, when reading the data.

The writing address control section 13 converts the predetermined part of the writing address into predetermined value in accordance with a designation of the writing access mode to output it to the memories 4A to 4D, or corrects the other part of the writing address in accordance with the designated writing access mode to output it to the memories 4A to 4D if the access space extends over the adjacent virtual minimum two dimensional memory space 1, when designating the writing address.

The write data control section 14 specifies the writing address in the virtual minimum two dimensional memory space 1 on the basis of apart of the writing address, and rearranges the pieces of write data into the memories 4A to 4D in accordance with the specified writing address and the designated writing access mode to write the rearranged write data into each designated address in each of the memories 4A to 4D at the same time, when writing the data into the memories 4A to 4D.

Referring now to FIG. 6, the detailed configuration of the reading address control section 11 and the read data control section 12 as shown in FIG. 5 will be described below.

The reading address control section 11 comprises an address controller 21 and four address correcting sections 22A to 22D, as shown in FIG. 6.

The address controller 21 outputs to the address correcting sections 22A to 22D an address conversion signal for converting the reading address A4, A5 corresponding to the lower two-bit address a0, a1 in each of the memories 4A to 4D to a predetermined value in accordance with a designation of the reading address A0, A1, A4, A5 and a designation of the reading access mode, or outputting to the address correcting sections 22A to 22D a correction signal for correcting the reading address A2, A3, A6 to A9 corresponding to the upper five-bit address a2 to a7 in each of the memories 4A to 4D to a predetermined value in accordance with a designation of the reading access mode if the access space extends over the adjacent virtual minimum two dimensional memory spaces 1.

Herein, the reading address "A0, A1" designates the address in the row direction (transverse direction) of the virtual minimum two dimensional memory space 1, corresponding to the lower address a0, a1 in the memories 4A to 4D. Also, the reading address "A4, A5" designates the address in the column direction (longitudinal direction) of the virtual minimum two dimensional memory space 1. Further, the reading address "A2, A3, A6 to A9" designates the address in the two dimensional memory space 3, corresponding to the address a2 to a7 in the memories 4A to 4D.

The address correcting sections 22A to 22D are provided corresponding to the memories 4A to 4D, and convert the reading address A4, A5 to a predetermined value upon an address conversion signal from the address controller 21 to output it to each of the memories 4A to 4D as the lower bit address a0, a1, and correct the reading address A2, A3, A6 to A9 by a predetermined value upon a correction signal from the address controller 21 to output it to each of the memories 4A to 4D as the upper five bit address a2 to a7.

The read data control section 12 comprises a data controller 23 and four selectors 24A to 24D, as shown in FIG. 6.

The data controller 23 specifies the reading address in the virtual minimum two dimensional memory space 1 in accordance with a designation of the reading address A0, A1, A4, A5, when reading the data and outputs a selection signal for the selectors 24A to 24D selecting the read data in the memories 4A to 4D to the selectors 24A to 24D in accordance with the reading access mode for designating the reading direction of data from the specified reading address.

The selectors 24A to 24D are provided corresponding to the memories 4A to 4D, and select the read data on an output line from the memories 4A to 4D on the basis of the selection signal from the data controller 23, and outputs (takes out) it at the same time.

Referring now to FIG. 7, the detailed configuration of the writing address control section 13 and the write data control section 14 as shown in FIG. 5 will be described below.

The writing address control section 13 comprises an address controller 31 and four address correcting sections 32A to 32D, as shown in FIG. 7.

The address controller 31 outputs to the address correcting sections 32A to 32D an address conversion signal for converting the writing address A4, A5 corresponding to the lower two-bit address a0, a1 in each of the memories 4A to 4D to a predetermined value in accordance with a designation of the writing address A0, A1, A4, A5 and a designation of the writing access mode, or outputs to the address correcting sections 32A to 32D an address correction signal for correcting the writing address A2, A3, A6 to A9 corresponding to the upper five-bit address a2 to a7 in each of the memories 4A to 4D to a predetermined value in accordance with a designation of the writing access mode if the access space extends over the adjacent virtual minimum two dimensional memory spaces 1.

Herein, the writing access mode is fundamentally the same as the reading access mode, and consists of three access modes.

The address correcting sections 32A to 32D are provided corresponding to the memories 4A to 4D, and convert the writing address A4, A5 to a predetermined value upon an address conversion signal from the address controller 31 to output it to each of the memories 4A to 4D as the lower bit address a0, a1, and correct the writing address A2, A3, A6 to A9 upon a correction signal from the address controller 31 to output it to each of the memories 4A to 4D as the upper five bit address a2 to a7.

The write data control section 14 comprises a data controller 33 and four selectors 34A to 34D, as shown in FIG. 7.

The data controller 33 specifies the writing address in the virtual minimum two dimensional memory space 1 in accordance with a designation of the writing address A0, A1, A4, A5, when writing the data and outputs a selection signal for the selectors 34A to 34D selecting the memories 4A to 4D to the selectors 34A to 34D in accordance with the writing access mode for designating the writing direction of data from the specified writing address.

The selectors 34A to 34D are provided corresponding to the memories 4A to 4D, and select the write data (e.g., 32 bits) from the outside to each designated address in each of the memories 4A to 4D in units of eight bits at the same time on the basis of the selection signal from the data controller 33, and outputs (takes out) it at the same time.

Referring now to FIGS. 8 to 10, the operation of the two dimensional data access memory according to the embodiment will be described below.

First of all, the operation of reading the data will be described. In this case, it is required to control the reading address with the address controller 21 and the address correcting sections 22A to 22D, and control the read data with the data controller 23 and the selectors 24A to 24D, and the data controller 23 will be first described.

The data controller 23 as shown in FIG. 6 specifies the reading address in the virtual minimum two dimensional memory space 1 in accordance with a designation of the reading address A0, A1, A4, A5, when reading the data, and outputs a selection signal for the selectors 24A to 24D selecting the memories 4A to 4D in accordance with the reading access mode to the selectors 24A to 24D.

For example, when the reading address "A0, A1" and "A4, A5" are designated as "00" and "00", and the row direction access mode (00) is designated as the reading access mode, the selector 24A selects memory 4A, selector 24B selects memory 4B, selector 24C selects memory 4C and selector 24D selects memory 4D, as indicated at No. 1 in FIG. 8.

For example, when the reading address "A0, A1" and "A4, A5" are designated as "00" and "00", and the column direction access mode (01) is designated as the reading access mode, the selector 24A selects memory 4A, selector 24B selects memory 4C, selector 24C selects memory 4B and selector 24D selects memory 4D, as indicated at No. 17 in FIG. 8.

The selectors 24A to 24D outputs the read data on the output line in each of the memories 4A to 4D at the same time in accordance with a selection signal from the data controller 23, when reading the data.

For example, in a case of No. 1 in FIG. 8, for each read data (e.g., 8 bits) on the output line in each of the memories 4A to 4D, data in memory 4A is output by selector 24A, data in memory 4B is output by selector 24B, data in memory 4C is output by selector 24C and data in memory 4D is output by selector 24D at the same time, when reading the data. Also, in a case of No. 17 in FIG. 8, for each read data on the output line in each of the memories 4A to 4D, data in memory 4A is output by selector 24A, data in memory 4C is output by selector 24B, data in memory 4B is output by selector 24C and data in memory 4D is output by selector 24D at the same time, when reading the data.

On one hand, the address controller 21 outputs an address conversion signal for converting the reading address A4, A5 corresponding to the lower two-bit address a0, a1 in each of the memories 4A to 4D to a predetermined value in accordance with a designation of the reading address A0, A1, A4, A5 and a designation of the reading access mode to the address correcting sections 22A to 22D.

For example, when the reading access mode is designated as the row direction access mode, the designated reading address "A4, A5" is not converted, if the reading address "A4, A5" is designated, as shown in FIG. 9. Accordingly, when the reading address "A4, A5" is designated as "00", for example, "00" is output as each address "a0, a1" for the memories 4A to 4D.

On the contrary, when the reading access mode is designated as the column direction access mode or row direction two stage access mode, the designated reading address "A4, A5" is converted, if the reading address "A4, A5" is designated, as shown in FIG. 9. For example, when the reading access mode is designated as the column direction access mode, the address "a0, a1" in memory 4A is not converted, but each address in memory 4B, 4C and 4D is converted into "01", "10" and "11", respectively, and output, if the reading address "A4, A5" is designated as "00".

Further, the address controller 21 outputs directly the designated reading address A2, A3, A6 to A9 as the address corresponding to the upper five-bit address d2 to d7 in each of the memories 4A to 4D in accordance with a designation of the reading access mode, if the access space extends over the adjacent virtual minimum two dimensional memory spaces 1 (see FIGS. 3 and 4), or outputs a correction signal for correcting the designated reading address A2, A3, A6 to A9 to output the corrected address as the upper five-bit address d2 to d7 in each of the memories 4A to 4D to the address correcting sections 22A to 22D.

For example, when the reading access mode is designated as the row direction access mode, and the reading address A0, A1, A4, A5 are designated "1000", as indicated at No. 2 in FIG. 10, the address controller 21 outputs a correction signal for adding the address a2 to a7 in the memory 22A by "+1" to the address correction section 22A. Accordingly, "+1" or "+4" means that the address a2 to a7 in memory 22A is added by "+1" or "+4" in FIG. 10.

The operation of writing the data will be now described. In this case, it is required to control the writing address with the address controller 31 and the address correcting sections 32A to 32D, and control the read data with the data controller 33 and the selectors 34A to 34D.

However, the operation of controlling the writing address with the address controller 31 and the address correcting sections 32A to 32D is almost the same as the operation of controlling the address with the address controller 21 and the address correcting sections 22A to 22D, and is not described here.

The data controller 33 specifies the writing address in the virtual minimum two dimensional memory space 1 in accordance with a designation of the writing address A0, A1, A4, A5, when writing the data and outputs a selection signal for the selectors 34A to 34D selecting the write data in the memories 4A to 4D to the selectors 34A to 34D in accordance with the writing access mode for designating the writing direction of data from the specified writing address. The data controller 33 is fundamentally the same as the operation of the data controller 23.

The selectors 34A to 34D select the write data from the outside on the basis of the selection signal from the data controller 33, and supply it to each designated address in each of the memories 4A to 4D at the same time.

As described above, with the two dimensional data access memory according to this embodiment, the continuous data arranged in the transverse or longitudinal direction from the designated location in the two dimensional memory space can be read from the physical memories 4A to 4D at the same time, and can be written into the physical memories 4A to 4D at the same time so that the data may be arranged continuously in the transverse or longitudinal direction from the designated location in the two dimensional memory space, thereby making the SIMD operation more efficient.

Figure 11:
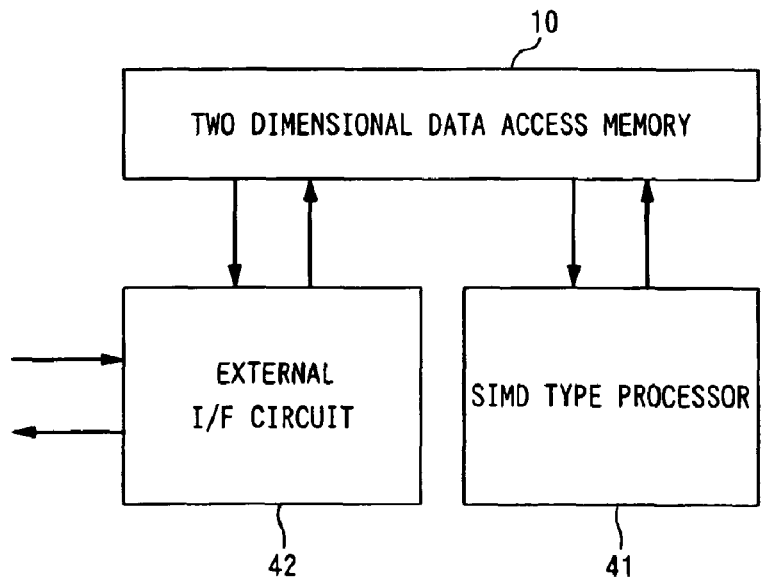
FIG. 11 is a block diagram showing a configuration of an operation processing apparatus according to the first embodiment of the invention.

Referring now to FIG. 11, the constitution of an operation processing apparatus of the invention will be described below.

The operation processing apparatus according to this embodiment enables an SIMD type processor 41 to perform the two dimensional DCT (two dimensional discrete cosine conversion), applying the two dimensional data access memory 10, as shown in FIGS. 5 to 7.

For this purpose, this operation processing apparatus has the two dimensional data access memory 10 connected to the SIMD type processor 41 and an external I/F circuit 42, as shown in FIG. 11.

The SIMD type processor 41 can designate the address for reading or writing the data in the two dimensional data access memory 10 in accordance with a predetermined operation process as will be described later, and can set up the access mode with a command program. Also, the external I/F circuit 41 can transmit or receive the data to or from the outside.

An operation example of the operation processing apparatus according to the embodiment will be set forth below.

Figure 12:
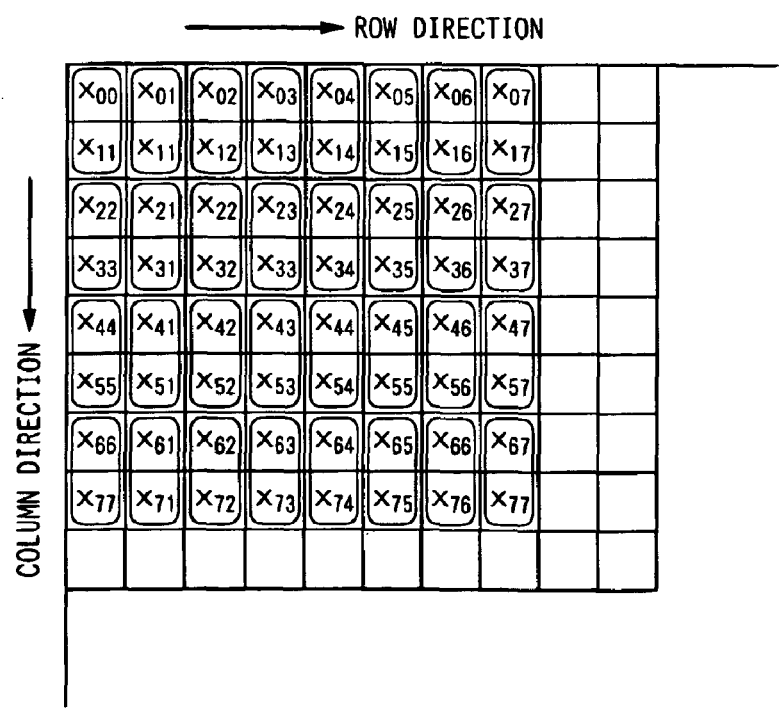
FIG. 12 is a diagram showing an operation example (writing example) of the two dimensional data access memory as shown in FIG. 11.

First of all, with the external I/F circuit 42, the 8×8 pixel data subjected to the two dimensional DCT is written into the two dimensional data access memory 10, as shown in FIG. 12.

The SIMD type processor 41 performs one dimensional DCT in the row direction. Therefore, the SIMD type processor 41 reads two pieces of pixel data in the column direction with a pair of pixel data in the even row and the odd row, as shown in FIG. 12, and one dimensional DCT of two lines is converted through the SIMD operation at the same time.

Figure 13:
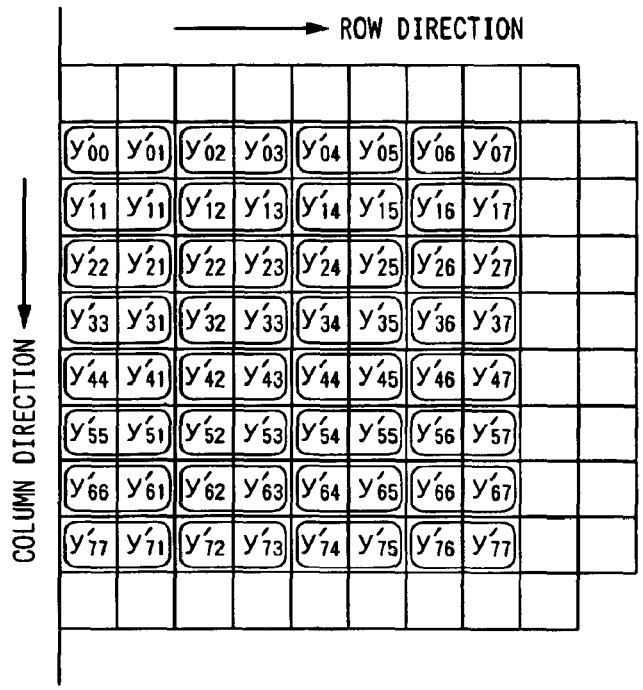
FIG. 13 is a diagram showing another operation example of the two dimensional data access memory.

And the result of one dimensional DCT in the row direction is rewritten into the two dimensional data access memory 10, as shown in FIG. 13.

Figure 14:
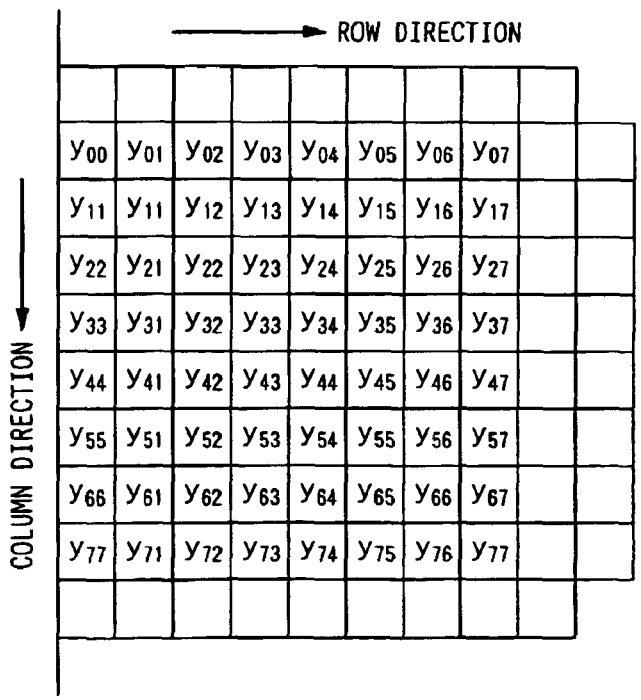
FIG. 14 is a diagram showing still another operation example of the two dimensional data access memory.

Further, the SIMD type processor 41 performs one dimensional DCT in the column direction. In this case, the data of two pixels are read in the row direction with a pair of pixel data in the even column and the odd column, one dimensional DCT of two columns is converted through the SIMD operation at the same time, and its result is rewritten into the two dimensional data access memory 10 again, as shown in FIG. 13. Thereby, the result of final two dimensional DCT is obtained in the two dimensional data access memory 10, as shown in FIG. 14. This result is output via the external I/F circuit 42 to the outside again.

As described above, with the operation processing apparatus according to this embodiment, the SIMD operation can be performed efficiently by employing the two dimensional data access memory according to this embodiment.

(Second Embodiment)

A second embodiment of the invention will be described below by reference to the drawings.

With a method of using a memory according to this embodiment, a virtual two dimensional memory space 1 as shown in FIG. 1 is defined in the same manner as in the first embodiment, and a two dimensional memory space 3 as shown in FIG. 3 is considered.

The method of using the memory according to this embodiment will be described below.

First of all, the two dimensional memory space 3 is considered in which the virtual minimum two dimensional memory spaces 1 as shown in FIG. 1 are arranged like tiles in the longitudinal and transverse directions as shown in FIG. 3.

On one hand, each address of the virtual minimum two dimensional memory space 1 is preassigned (associated) to each predetermined address in each of four physical memories 4A to 4D that is determined in relation with the size of virtual minimum two dimensional memory space 1 (see FIGS. 1 and 2).

The reading operation from the memories 4A to 4D will be described below in reading the continuous or predetermined discontinuous data from any address in the virtual minimum two dimensional memory space 1.

In this case, any reading address, and the reading access mode for specifying the reading direction of data are designated. This reading access modes include a row direction access mode, a column direction access mode, and a row direction two stage access mode, which are the same as in the first embodiment, and additionally a staggered mode.

Moreover, the method of using the memory in this embodiment offers an option mode for indicating the method of using the memory in estimating the movement vector of moving picture.

These option modes include a circular mode and a padding mode.

Each option mode and the staggered mode will be set forth below.

Figure 15:
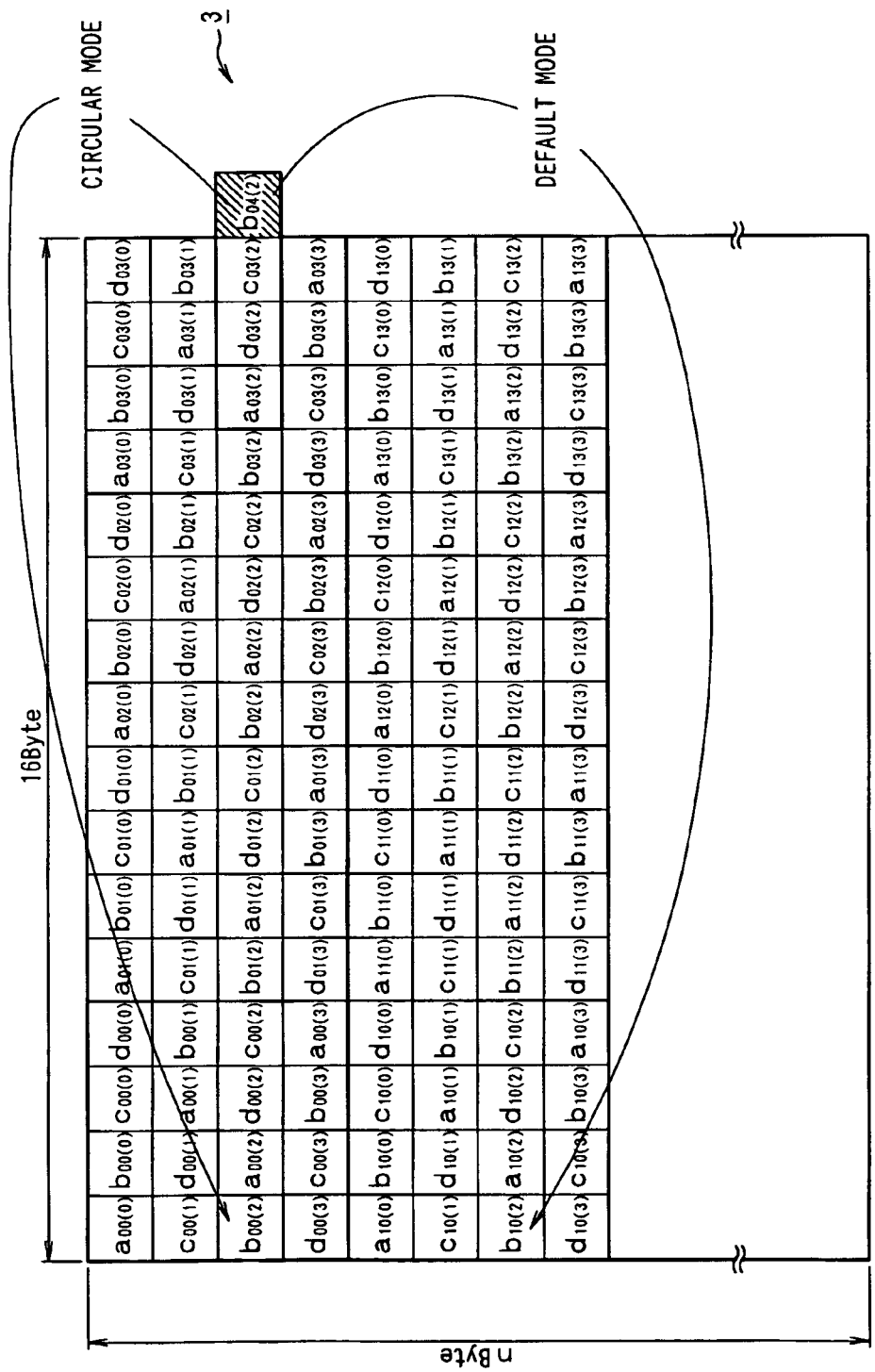
FIG. 15 is a diagram showing the address referred to in a circular mode, when passed over a storage area of the two dimensional memory space 3.

The circular mode allows the movement vector to be estimated efficiently, when the data to be referred to extends over the storage area of the two dimensional memory space 3 in estimating the movement vector, as shown in FIG. 15.

Figure 16:
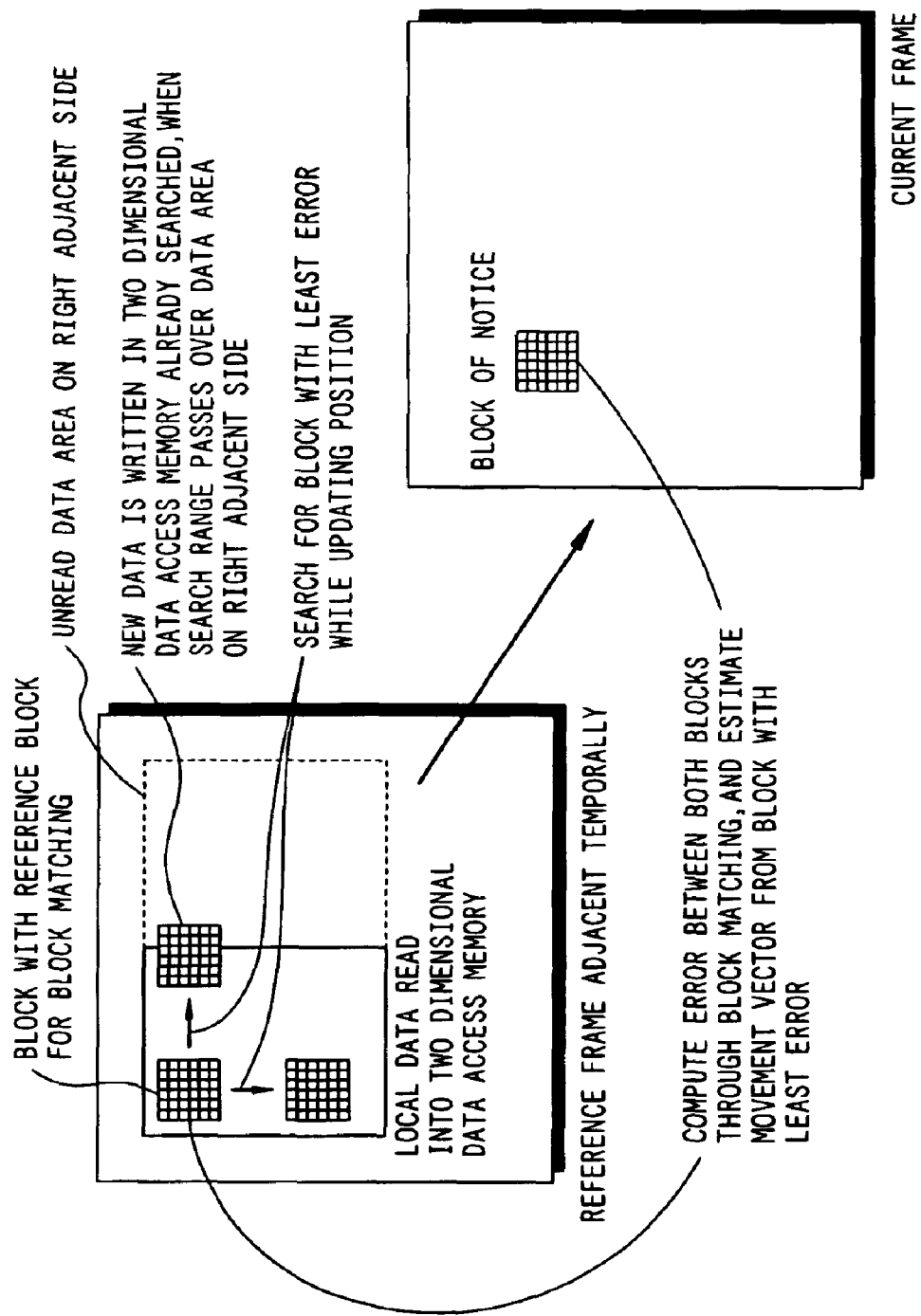
FIG. 16 is a view showing an operation example in the circular mode.

That is, in estimating the movement vector, a current frame and a certain area of a reference frame adjacent temporally (see FIG. 16) are stored in the two dimensional memory space 3. And the retrieval (blockmatching) for a block with the least error (most approximate block) to a block of notice in the current frame is made from among the data stored in the two dimensional memory space 3. At this time, in the circular mode, the data in the row direction continuous to the data of the reference frame currently stored in the two dimensional memory space 3, viz., the data adjacent to the right side of the storage area of the two dimensional memory space 3 is overwritten in an area of the two dimensional memory space 3 that has been retrieved at a certain timing as will be described later. Namely, in the two dimensional memory space 3, the data in the row direction continuous from the storage area of the two dimensional memory space 3 in the reference frame is stored cyclically for the referred to data.

And, when the retrieved area (block) is moved successively in the two dimensional memory space 3, and the data passed over the boundary of the storage area in the two dimensional memory space 3 is referred to, the address of the data to be referred to is corrected if the data to be referred to is beyond the boundary (right end) of the storage area in the two dimensional memory space 3, and the data at predetermined address (predetermined data stored cyclically) overwritten in the two dimensional memory space 3 is referred to in estimating the movement vector. Accordingly, in the circular mode, the user does not require to be aware of whether or not the retrieved area extends across the boundary of the two dimensional memory space 3, whereby the movement vector can be estimated efficiently.

Herein, a method of estimating the movement vector in the circular mode will be set forth below.

Figure 17:
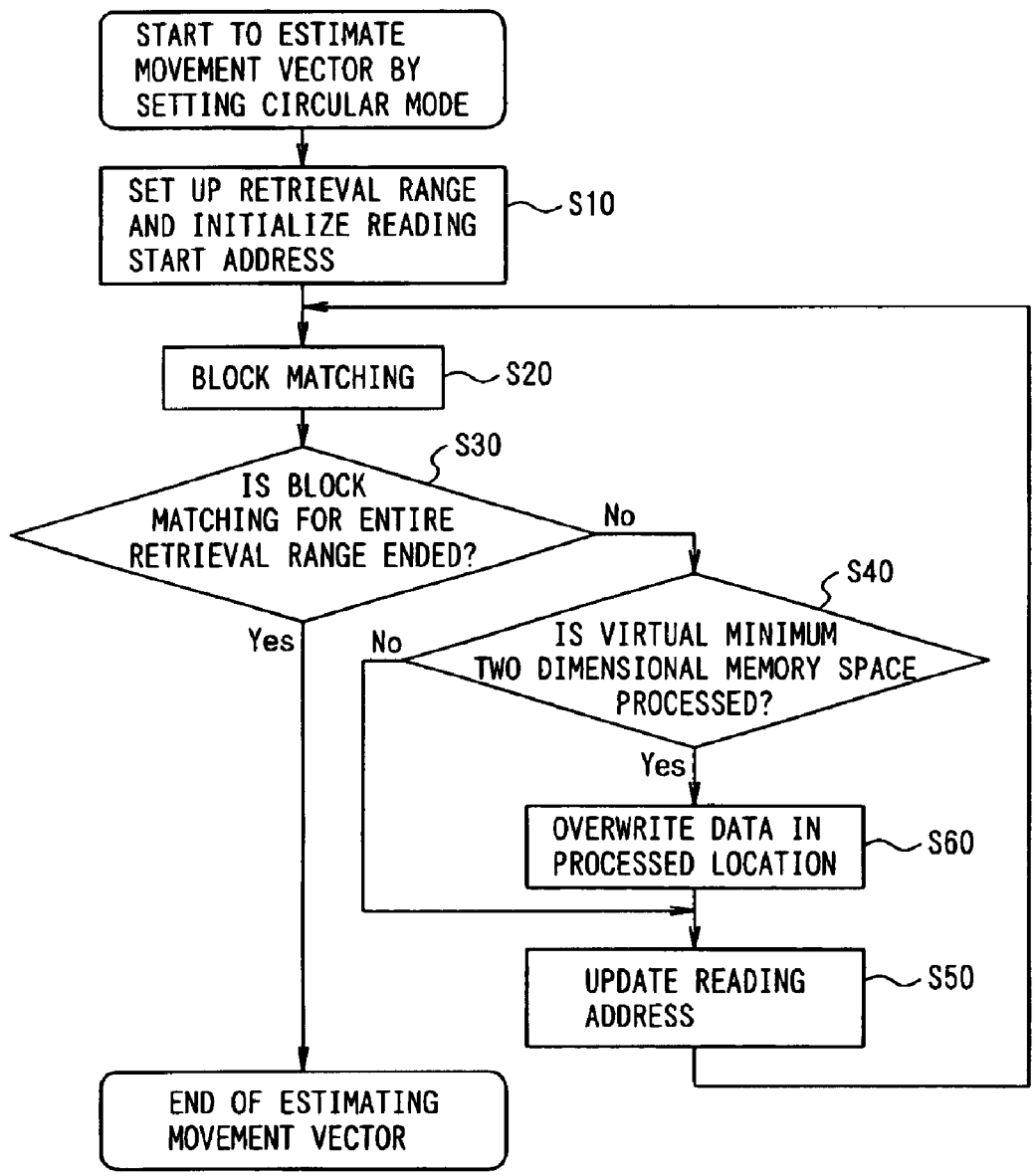
FIG. 17 is a flowchart showing a procedure for estimating a movement vector in the circular mode.

FIG. 17 is a flowchart showing a procedure for estimating the movement vector in the circular mode.

In FIG. 17, if the circular mode is designated and the movement vector estimation is started, the retrieved area in the reference frame is set up, and the reading address of data in the virtual minimum two dimensional memory space 3 is initialized (step S10).

Then, the block matching is made by referring to the read data from a predetermined address (step S20), and it is determined whether or not the block matching for all the retrieved area is ended (step S30).

At step S30, if the block matching is not ended for all the retrieved area, it is determined whether or not the block matching for all the data in the virtual minimum two dimensional memory space 1 is ended (step S40).

At step S40, if the block matching for all the data in the virtual minimum two dimensional memory space 1 is not ended, the reading address in the virtual minimum two dimensional memory space 1 is updated (step S50), because there is no block matching for unprocessed data, and then the procedure gets back to step S20.

On the other hand, at step S40, if the block matching for all the data in the virtual minimum two dimensional memory space 1 is ended, the new reference data (e.g., row direction data adjacent in the reference frame) is overwritten, (step S60), because the block matching for the virtual minimum two dimensional memory space 1 has been ended (i.e., processed), and then the procedure goes to step S50.

At step S30, if the block matching for all the retrieved area is ended, the movement vector estimation is ended.

The padding mode will be now set forth.

Figure 18:
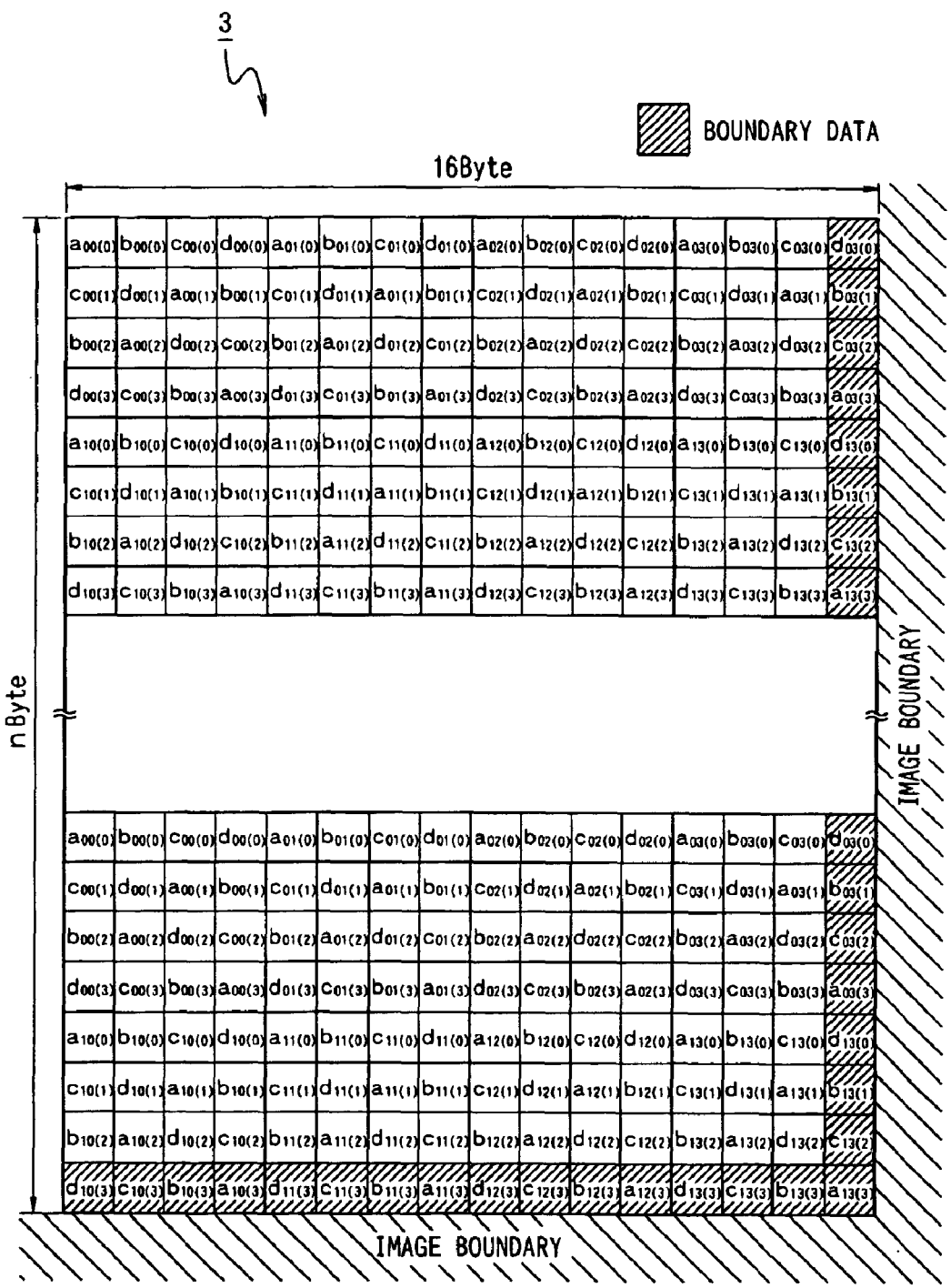
FIG. 18 is a diagram showing a state where the boundary of the storage area in the two dimensional memory space 3 is coincident with the image boundary of a reference frame in a padding mode.

The padding mode is to estimate the movement vector properly, when the boundary of the storage area in the two dimensional memory space 3 is coincident with the image boundary (e.g., right end or lower end of image) of the reference frame in estimating the movement vector, as shown in FIG. 18.

In estimating the movement vector, the retrieved area (block) is moved successively in the two dimensional memory space 3. At this time, the boundary of the storage area in the two dimensional memory space 3 is coincident with the image boundary of the reference frame (see FIG. 18), wherein even if the data passed over the boundary of this storage area is referred to, the data beyond the boundary of the storage area (right end or lower end) does not essentially exist. Thus, in the padding mode, for the data beyond the boundary (right end or lower end) of the storage area, the movement vector is estimated by referring to the boundary data (i.e., data stored at the right end or lower end of the two dimensional memory space 3). Namely, for the data beyond the boundary (right end or lower end) of the storage area, the boundary data is supplemented in the outer periphery around the image boundary for the reference frame and referred to. Accordingly, in the padding mode, even when the boundary of the storage area in the two dimensional memory space 3 is coincident with the image boundary of the reference frame, the movement vector can be estimated appropriately.

While this embodiment has been described above in connection with an instance in which the data is referred to beyond the boundary of the storage area at the right or lower end of the two dimensional memory space 3, the invention is also applicable to an instance in which the data is referred to beyond the boundary of the storage area at the left or upper end of the two dimensional memory space 3. In this case, the correction values as listed in FIG. 25 are changed to the values adapted to refer to the data beyond the boundary of the storage area at the left or upper end of the two dimensional memory space 3 to achieve the same effect as above.

The staggered mode will be now set forth.

The staggered mode is input as one of the reading access modes, and can effect the fast block matching in estimating the movement vector, as shown in FIG. 19.

That is, in estimating the movement vector, a certain area of the reference frame adjacent to the current frame temporally is stored in the two dimensional memory space 3. And of the data of 4×4 pixels in the virtual minimum two dimensional memory space 1 for the two dimensional memory space 3, a total of four pixels that lie in the first and third rows and in the first and third columns are read, and subjected to the block matching. This processing is performed for each virtual minimum two dimensional memory space 1 in the two dimensional memory space 3. Similarly, this processing is repeated while changing the address of pixel data to be read in the virtual minimum two dimensional memory space 1, as shown in FIG. 20. Thus, the block matching for all the pixels can be performed, whereby the block with the least error can be retrieved correctly.

Herein, in making the block matching, the block having the least accumulated residual between each pixel data for the block of notice and each pixel data to be referred to is determined to be the most approximate block. Also, in making the block matching in the staggered mode, four times of the block matching are performed as shown in FIG. 20, so that the block matching for all the pixel data can be performed. At this time, in the staggered mode, the threshold for the accumulated residual corresponding to the number of executing the block matching is set up, as shown in FIG. 21, whereby if the accumulated residual of each pixel data contained in each block exceeds the threshold, the block matching for its block is stopped, and proceeds to the block matching for the next pixel data. Accordingly, since the block matching for all the pixels is not required, the block matching can be performed fast for the data stored in the two dimensional memory space 3. In other words, the movement vector can be estimated fast. The pattern for reading the pixel data for the block matching may be one starting from any address, in addition to those as shown in FIGS. 19 and 20.

In FIG. 21, the reason that the thresholds d1, d2, d3 are greater predetermined values than a line connecting an origin (0) and d4 is due to the fact that the residual exceeds the value of the line for example, at a time of reading in FIG. 20A, in a block matching process of the staggered mode, whereby a situation is avoided where the block with the least error is discarded in the following process (i.e., other blocks than the block with the least error are excluded from the object of the block matching).

In this way, if any reading address in the virtual minimum two dimensional memory space 1 is designated, and the reading access mode and the option mode are designated, each address corresponding to each of the memories 4A to 4D is designated in accordance with the designated reading address, the designated reading access mode and the designated option mode, so that the data is read and the read data is output at the same time.

For example, in FIG. 15, address $a_{03(2)}$ is designated in the virtual minimum two dimensional memory space 1, and the row direction access mode as indicated at M3 and the circular mode are designated. In this case, address $a_{03(2)}$ is designated in memory 4A, address $b_{04(2)}$ is designated in memory 4B, address $c_{03(2)}$ is designated in memory 4C and address $d_{03(2)}$ is designated in memory 4D, whereby each data is read at the same time. At this time, the address is in the same row in the two dimensional memory space 3, and the left end address is associated with the address $b_{04(2)}$ in memory 4B, and the data at address $b_{04(2)}$ in memory 4B is read by accessing the address at the left end in the same row in the two dimensional memory space 3.

For example, in FIG. 18, address $d_{03(2)}$ is designated in the virtual minimum two dimensional memory space 1, and the row direction access mode as indicated at M3 and the padding mode are designated. In this case, no data is read from the memories 4A and 4B, and address $c_{03(2)}$ is designated in memory 4C and address $d_{03(2)}$ is designated in memory 4D, whereby each data is read at the same time. At this time, for a portion beyond the image boundary, the boundary data, viz., the data at address $c_{03(2)}$ in memory 4C is read.

For example, in FIG. 19, address $a_{n(0)}$ is designated in the virtual minimum two dimensional memory space 1, and the staggered mode is designated. In this case, address $a_{n(0)}$ is designated in memory 4A, address $b_{n(2)}$ is designated in memory 4B, address $c_{n(0)}$ is designated in memory 4C and address $d_{n(2)}$ is designated in memory 4D, whereby each data is read at the same time. Further, when the block matching is made as shown in FIG. 20, each data is read by designating predetermined address.

As described above, with the method of using the memory in this embodiment, when the access location in the two dimensional memory space 3, the reading access mode and the option mode are designated, the processing (as defined in the circular mode, the padding mode or the staggered mode) for estimating the movement vector is performed in accordance with the designations. The method of using the memory in this embodiment can contribute to making the SIMD operation more efficient in respect of estimating the movement vector.

Figure 22:
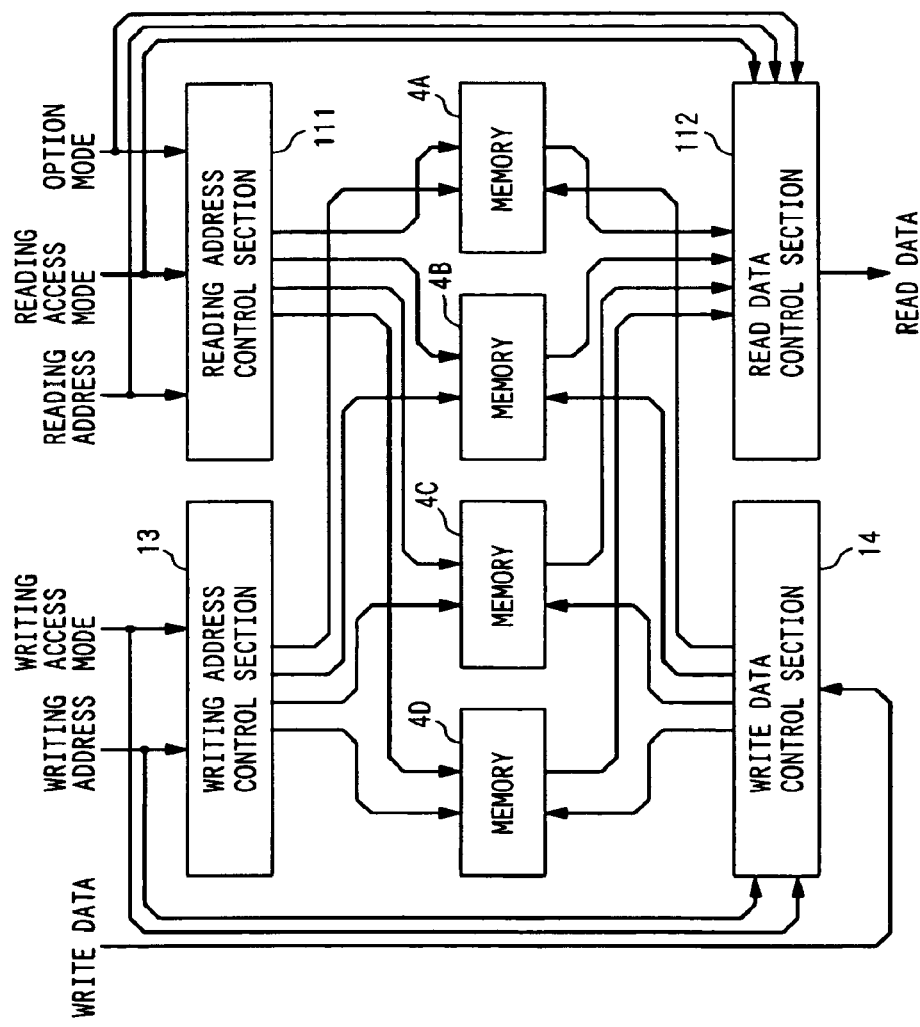
FIG. 22 is a block diagram showing a configuration of a two dimensional data access memory according to a second embodiment of the invention.
Figure 23:
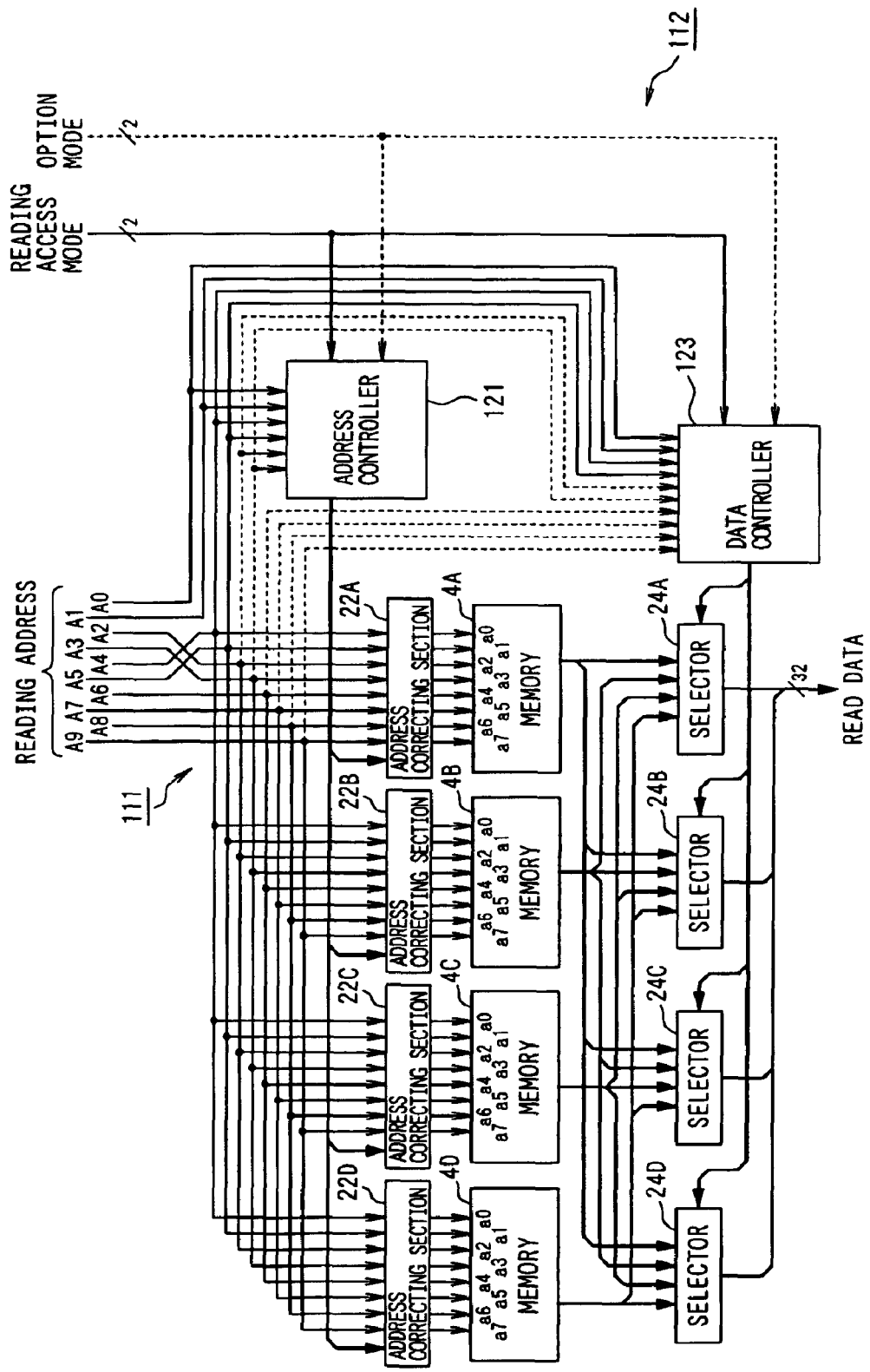
FIG. 23 is a diagram showing the detailed configuration of a reading address control section 111 and a read data control section 112.

Referring now to FIGS. 22 and 23, the constitution of the two dimensional access memory according to the embodiment of the invention will be described below.

The two dimensional data access memory 100 according to this embodiment embodies the method of using the memory in the above embodiment and has the fundamental configuration as the two dimensional data access memory 10 in the first embodiment, except that a signal indicating the option mode is input into a reading address control section 111 and a read data control section 112 (see FIG. 22). Accordingly, different portions including the reading address control section 111 and the read data control section 112 will be only discussed, and the other portions are not described here, in which the same numerals are attached to the same or like parts for the two dimensional data access memory 10 in the previous embodiment.

The reading address control section 111 converts the predetermined part of the reading address into predetermined value in accordance with a designation of the reading access mode to output it to the memories 4A to 4D, or corrects the other part of the reading address in accordance with the designated reading access mode to output it to the memories 4A to 4D if the access space extends over the adjacent virtual minimum two dimensional memory space 1 (see FIGS. 3 and 4), when designating the reading address.

In the case where the circular mode is input as the option mode, the reading address control section 111 corrects the reference address of the data to the address of predetermined data stored cyclically to output it to the memories 4A to 4D, if the data is referred to beyond the boundary (right end) of the storage area in the two dimensional memory space 3.

In the case where the padding mode is input as the option mode, the reading address control section 111 refers to the address of the data at the boundary of the storage area to output it to the memories 4A to 4D, if the data passed over the boundary of the storage area in the two dimensional memory space 3 is referred to, when the boundary of the storage area is coincident with the boundary portion of the reference frame.

Further, in the case where the staggered mode is input as the reading access mode, the reading address control section 111 corrects the address to be referred to in the virtual minimum two dimensional memory space 1 to the address of the predetermined reference pattern (see FIG. 19) to output it to the memories 4A to 4D.

The read data control section 112 specifies the reading address in the virtual minimum two dimensional memory space 1 on the basis of a part of the reading address, and rearranges the pieces of read data from the memories 4A to 4D in accordance with the specified reading address, and the designated reading access mode and option mode to output the rearranged read data at the same time, when reading the data.

Referring now to FIG. 23, the detailed configuration of the reading address control section 111 and the read data control section 112 as shown in FIG. 22 will be described below.

The reading address control section 111 comprises an address controller 121 and four address correcting sections 22A to 22D, as shown in FIG. 23.

The address controller 121 outputs an address conversion signal for converting the reading address A4, A5 corresponding to the lower two-bit address a0, a1 in each of the memories 4A to 4D to a predetermined value in accordance with a designation of part or all of the reading address A0 to A9 and a designation of the reading access mode and option mode, to the address correcting sections 22A to 22D, or outputting to the address correcting sections 22A to 22D a correction signal for correcting the reading address A2, A3, A6 to A9 corresponding to the upper five-bit address a2 to a7 in each of the memories 4A to 4D to a predetermined value in accordance with a designation of the reading access mode if the access space extends over the adjacent virtual minimum two dimensional memory spaces 1, and the circular mode is designated as the option mode.

The configuration of the address correcting sections 22A to 22D is the same as that of the address correcting sections 22A to 22D as shown in FIG. 6, and is not described here.

The read data control section 112 comprises a data controller 123 and four selectors 24A to 24D, as shown in FIG. 23.

The data controller 23 specifies the reading address in the virtual minimum two dimensional memory space 1 in accordance with a designation of part or all of the reading address A0 to A9 when reading the data and outputs a selection signal for the selectors 24A to 24D selecting the memories 4A to 4D to the selectors 24A to 24D in accordance with the reading access mode for designating the reading direction of data from the specified reading address and the designated option mode.

The constitution of the selectors 24A to 24D is the same as that of the selectors 24A to 24D as shown in FIG. 6, and is not described here.

Referring now to FIGS. 24 to 28, the operation of the two dimensional data access memory according to the embodiment having such a constitution will be described below. In this case, it is required to control the reading address with the address controller 121 and the address correcting sections 22A to 22D, and control the read data with the data controller 123 and the selectors 24A to 24D. The address control and the read data control will be set forth below in connection with the instances where each option mode is input, and where the staggered mode is input as the reading access mode.

When the circular mode is input as the option mode, the data controller 123 as shown in FIG. 23 specifies the reading address in the virtual minimum two dimensional memory space 1 in accordance with a designation of the reading address A0, A1, A4, A5, and outputs a selection signal for the selectors 24A to 24D selecting the memories 4A to 4D in accordance with the reading access mode to the selectors 24A to 24D.

The address controller 121 as shown in FIG. 23 outputs an address conversion signal for converting the reading address A4, A5 corresponding to the lower two-bit address a0, a1 in each of the memories 4A to 4D to a predetermined value in accordance with a designation of the reading address A0, A1, A4, A5 and a designation of the reading access mode to the address correcting sections 22A to 22D.

If the data passed over the boundary of the storage area in the two dimensional memory space 3 is referred to, the address controller 121 outputs a correction signal for correcting (converting) the address of the data to the address of predetermined data (i.e., address of data stored cyclically in the two dimensional memory space 3) to the address correcting sections 22A to 22D.

For example, when the reading address "A0, A1" and "A4, A5" are designated as "00" and "00", and the row direction access mode (00) is designated as the reading access mode, an address correcting section 22A outputs "−3", an address correcting section 22B outputs "0", an address correcting section 22C outputs "0", and an address correcting section 22D outputs "0", respectively as the correction value, as indicated at No. 2 in FIG. 24.

Similarly, in the case where the column direction access mode or column direction two stage access mode is designated, "−(n-4)" is output as the correction value for the address of the data referred to across the boundary in the column direction, when the two dimensional memory space 3 consists of n bytes longitudinally as shown in FIG. 15. FIG. 25 is a diagram showing the address correction value following the upper third bit and the following bits when the column direction access mode and the column direction two stage access mode are designated.

Herein, in the case where the reading address A0 to A9 is represented by the compliment of 2 without sign, if the data is referred to across the boundary (lower end) of the two dimensional memory space 3 in the column direction, the reading address returns to "0". Accordingly, in this case, it is unnecessary to provide a table with the contents as shown in FIG. 25. In the row direction access mode, the reading address does not return to "0" when the data is referred to across the boundary (right end) of the two dimensional memory space 3, and it is required to provide a table with the contents as shown in FIG. 24.

When the padding mode is input as the option mode, the data controller 123 as shown in FIG. 23 specifies the reading address in the virtual minimum two dimensional memory space 1 in accordance with a designation of the reading address A0, A1, A4, A5, and outputs a selection signal for the selectors 24A to 24D selecting the memories 4A to 4D in accordance with the reading access mode to the selectors 24A to 24D.

For example, when the reading address "A0, A1" and "A4, A5" are designated as "10" and "00", and the row direction access mode (00) is designated as the reading access mode, the selector 24A selects the memory 4B, the selector 24B selects the memory 4C, the selector 24C selects the memory 4D, and the selector 24D selects the memory 4D, as indicated at No. 2 in FIG. 26.

The address controller 121 as shown in FIG. 23 outputs an address conversion signal for converting the reading address A4, A5 corresponding to the lower two-bit address a0, a1 in each of the memories 4A to 4D to a predetermined value in accordance with a designation of the reading address A0, A1, A4, A5 and a designation of the reading access mode to the address correcting sections 22A to 22D.

When the staggered mode is input as the reading access mode, the data controller 123 as shown in FIG. 23 specifies the reading address in the virtual minimum two dimensional memory space 1 in accordance with a designation of the reading address A0, A1, A4, A5, and outputs a selection signal for the selectors 24A to 24D selecting the memories 4A to 4D to the selectors 24A to 24D.

For example, when the reading address "A0, A1" and "A4, A5" are designated as "10" and "00", the selector 24A selects the memory 4B, the selector 24B selects the memory 4D, the selector 24C selects the memory 4A, and the selector 24D selects the memory 4C, as indicated at No. 42 in FIG. 27.

The address controller 121 as shown in FIG. 23 outputs an address conversion signal for converting the reading address A4, A5 corresponding to the lower two-bit address a0, a1 in each of the memories 4A to 4D to a predetermined value in accordance with a designation of the reading address A0, A1, A4, A5 to the address correcting sections 22A to 22D.

For example, when the reading address "A0, A1" and "A4, A5" are designated as "10" and "00", the address correcting section 22A outputs the correction value for correcting the address of the lower two-bit address a0, a1 in each of the memories 4A to 4D to "01" for the memory 4A, "00" for the memory 4B, "01" for the memory 4C and "00" for the memory 4D.

As described above, with the two dimensional data access memory according to this embodiment, the discontinuous data arranged from the designated location in the two dimensional memory space in the staggered mode is read from the physical memories 4A to 4D at the same time, whereby the block matching can be made in estimating the movement vector. In addition, in the circular mode, when the data passed over the boundary of the storage area in the two dimensional memory space is referred to, the data at the correct address for the reference frame is referred to. Further, in the padding mode, when the data is referred to beyond the boundary of the reference frame, the boundary data is supplemented, and can be referred to. Accordingly, the movement vector can be estimated efficiently and properly, and the efficient SIMD operation can be effected in the process.

The constitution of an operation processing apparatus according to an embodiment of the invention will be described below.

The operation processing apparatus according to this embodiment enables an SIMD type processor 41 to estimate the movement vector, applying the two dimensional data access memory 100, as shown in FIGS. 22 and 23.

Figures 28, 29:
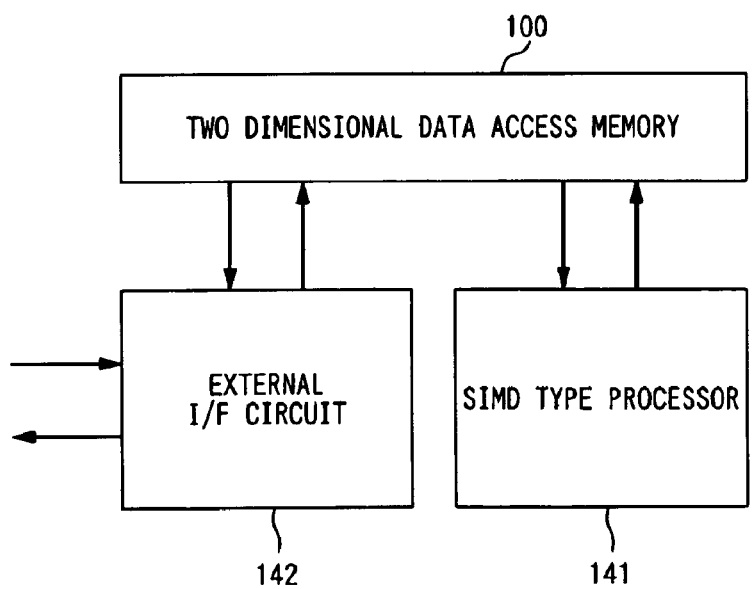
FIG. 28 is a diagram showing addresses a0, a1 for lower two bits in memories 4A to 4D in the staggered mode.
FIG. 29 is a block diagram showing a configuration of an operation processing apparatus according to a second embodiment of the invention.

For this purpose, this operation processing apparatus has the two dimensional data access memory 100 connected to the SIMD type processor 141 and an external I/F circuit 142, as shown in FIG. 29.

The SIMD type processor 141 can designate the address for reading or writing the data in the two dimensional data access memory 100 in accordance with a predetermined operation process as will be described later, and can set up the access mode and the option mode with a command program. Also, the external I/F circuit 141 can transmit or receive the data to or from the outside.

Figure 30:
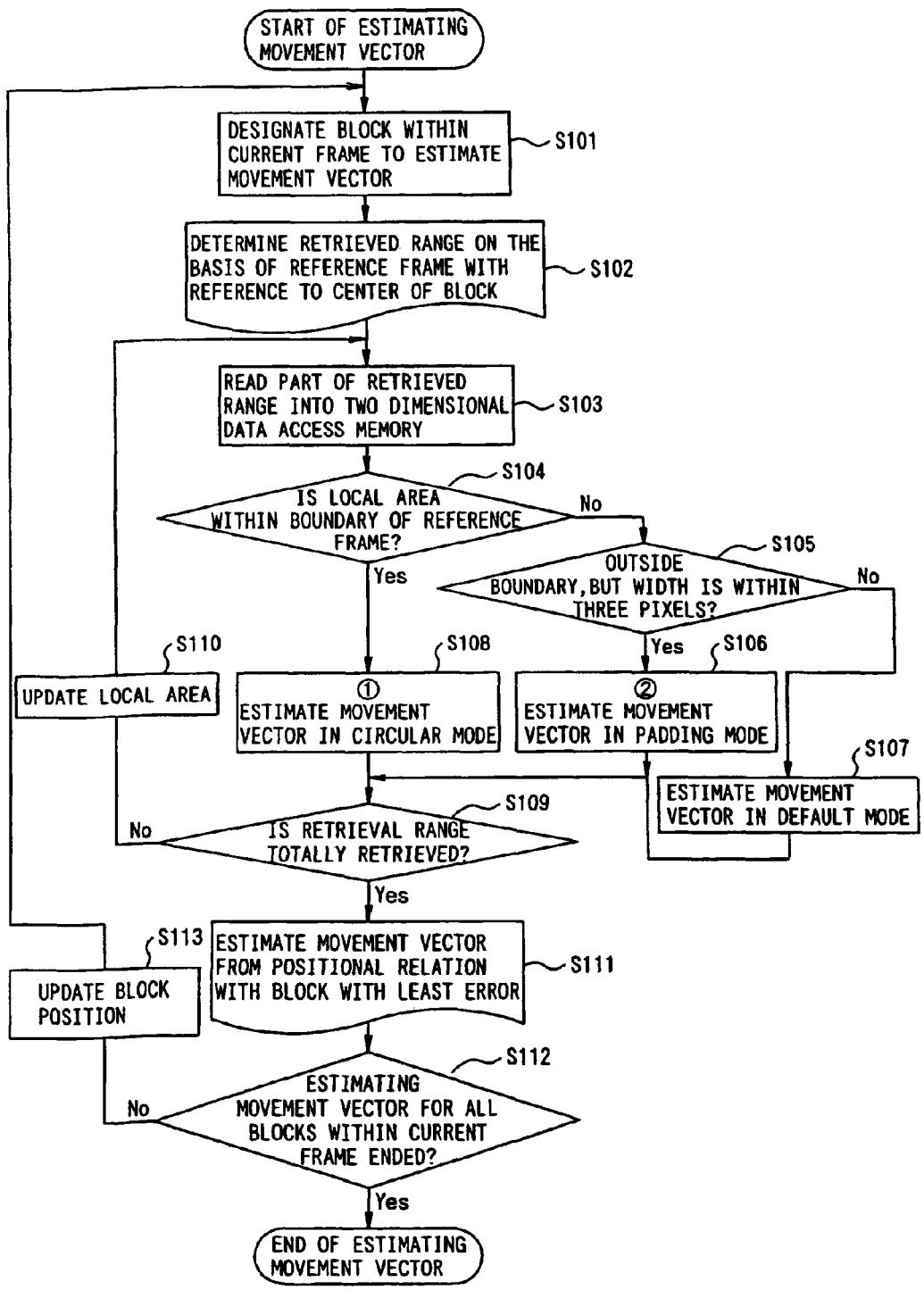
FIG. 30 is a flowchart showing an operation of movement vector estimating process in the operation processing apparatus according to the second embodiment of the invention.

An operation example of the operation processing apparatus according to the embodiment having such a constitution will be set forth below. FIG. 30 is a flowchart showing the operation for estimating the movement vector in the operation processing apparatus according to this embodiment.

Figure 31:
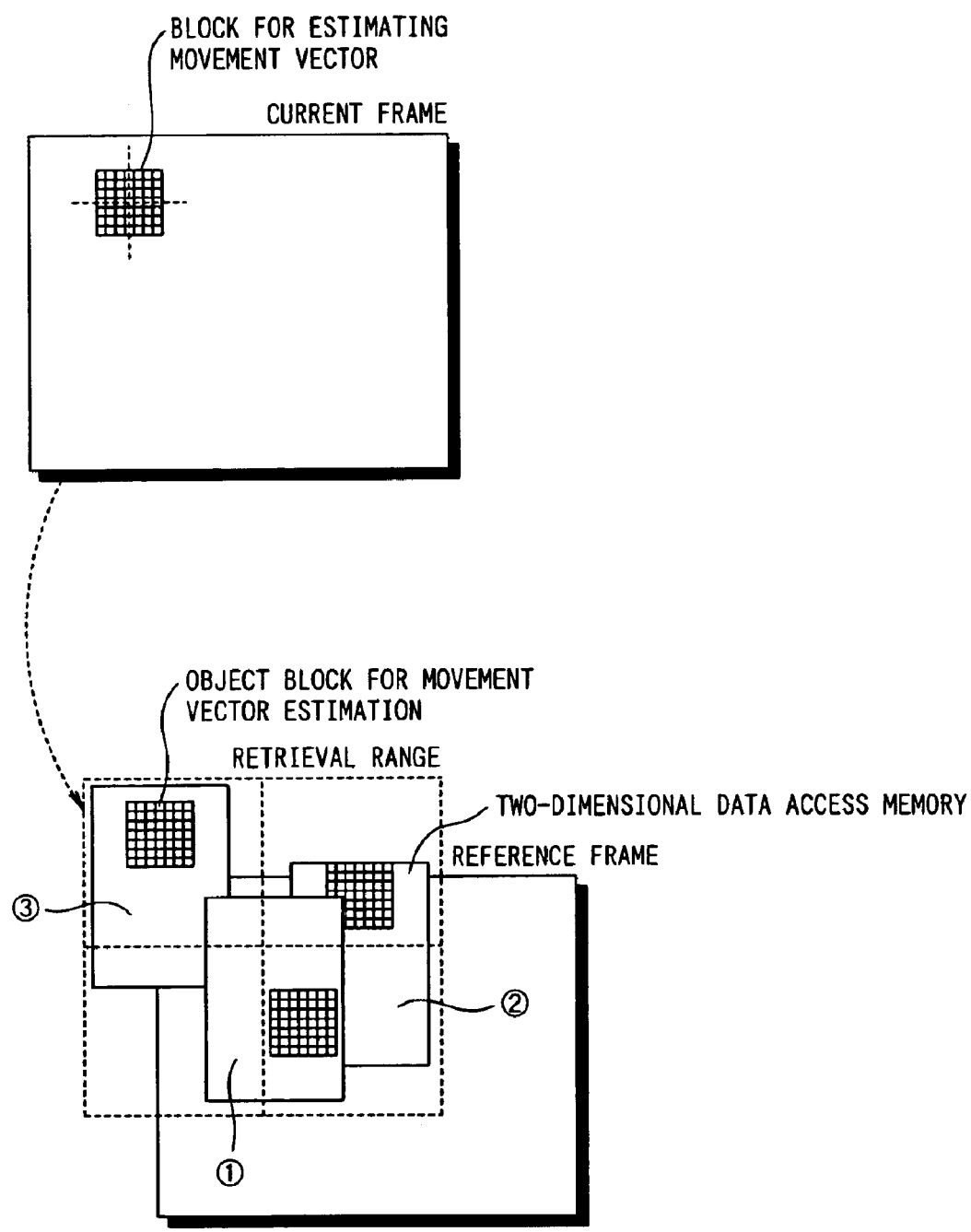
FIG. 31 is a diagram showing a relation of a current frame and a reference frame with a retrieval object range and an area stored in a two dimensional data access memory 100 in a retrieval object range.

In FIG. 30, the operation processing apparatus designates a block for estimating the movement vector within the current frame (step S101), and determines the retrieved range based on the reference frame with reference to the center of the block (step S102). FIG. 31 is a diagram showing the relation of the current frame and the reference frame with the retrieved range, in which an area stored in the two dimensional data access memory 100 in the retrieved range is represented.

And the operation processing apparatus reads a part of the retrieved range (herein after referred to as a"local area") into the two dimensional data access memory 100 (step S103), and it is determined whether or not the local area is fully contained within the reference frame (i.e., does not exceed the boundary) (step S104).

At step S104, if the local area is not fully contained within the reference frame, the operation processing apparatus makes a determination whether or not the range of local area outside the boundary of the reference frame (outside range) is within three pixels (step S105). If it is determined that the range of local area outside the boundary of the reference frame (outside range) is within three pixels, the option mode is set to the padding mode, and the outside range is subjected to block matching while referring to the boundary data (step S106). And the procedure of the operation processing apparatus transfers to step S109.

At step S105, if it is determined that the range of local area outside the boundary of the reference frame (outside range) is not within three pixels, the operation processing apparatus sets up the option mode to the default mode (i.e., the normal processing mode where the circular mode and the padding mode are not made) m and the outside range is subjected to block matching by supplementing the boundary data in another process, because of referring to the range (four or more pixels) that cannot be supplemented in the padding mode (step S108) And the procedure of the operation processing apparatus transfers to step S109.

At step S104, if it is determined that the local area is fully contained within the reference frame, the operation processing apparatus sets up the option mode to the circular mode, the data adjacent to the local area in the reference frame is overwritten in the storage area already referred to in the two dimensional data access memory 100, the data referred to across the boundary of the local area is subjected to block matching, referring to the predetermined overwritten data (step S108). And the procedure of the operation processing apparatus goes to step S109.

After steps S106 to S108, the operation processing apparatus makes a determination whether or not the entire retrieved area has been retrieved (subjected to blockmatching) (step S109). If it is determined that the entire retrieved area has not been retrieved, the local area is updated in the range of subsequent retrieval (step S110). And the procedure of the operation processing apparatus gets back to step S103.

At step S109, if it is determined that the entire retrieved range has been retrieved, the operation processing apparatus estimates the movement vector on the basis of the positional relation of the reference frame with the block with the least error, as a result of block matching (step S111), and makes a determination whether or not the movement vector has been estimated for all the blocks in the current frame (step S112).

At step S112, if the movement vector has not been estimated for all the blocks in the current frame, the position of the block for estimating the movement vector in the current frame is updated (step S113), and then the procedure returns to step S101. On the other hand, at step S112 if it is determined that the movement vector has been estimated for all the blocks in the current frame, the movement vector estimation is ended.

As described above, with the operation processing apparatus according to this embodiment, the movement vector can be estimated efficiently and properly by employing the two dimensional data access memory according to this embodiment, and the efficient SIMD operation can be implemented in the process.

As described above, with the two dimensional data access memory according to the second embodiment of the invention, the discontinuous data arranged from the designated location in the two dimensional memory space in the staggered mode is read from the physical memories 4A to 4D at the same time, whereby the block matching can be made in estimating the movement vector. In addition, in the circular mode, when the data passed over the boundary of the storage area in the two dimensional memory space is referred to, the data at the correct address for the reference frame is referred to. Further, in the padding mode, when the data is referred to beyond the boundary of the reference frame, the boundary data is supplemented, and can be referred to. Accordingly, the movement vector can be estimated efficiently and properly, and the efficient SIMD operation can be effected in the process.

Further, with the operation processing apparatus according to the second embodiment of the invention, the movement vector can be estimated efficiently and properly by employing the two dimensional data access memory according to the second embodiment, and the efficient SIMD operation can be implemented in the process.

Figure 32:
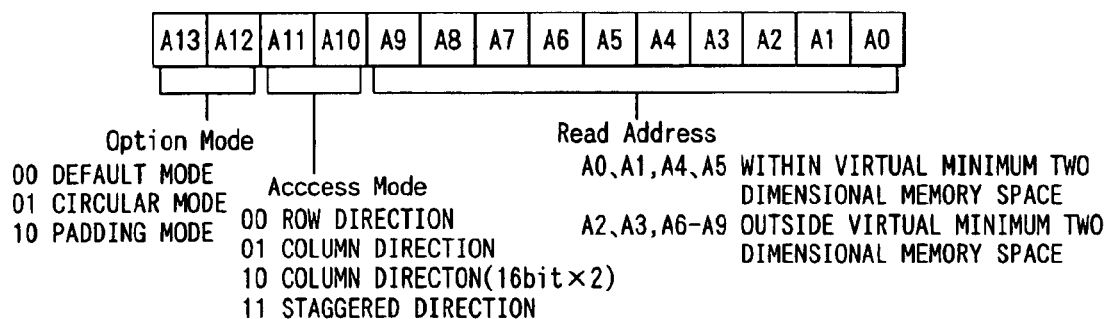
FIG. 32 is a diagram showing a data configuration example when the most significant bit of an address signal is assigned an access mode or an option mode.
Figure 33:
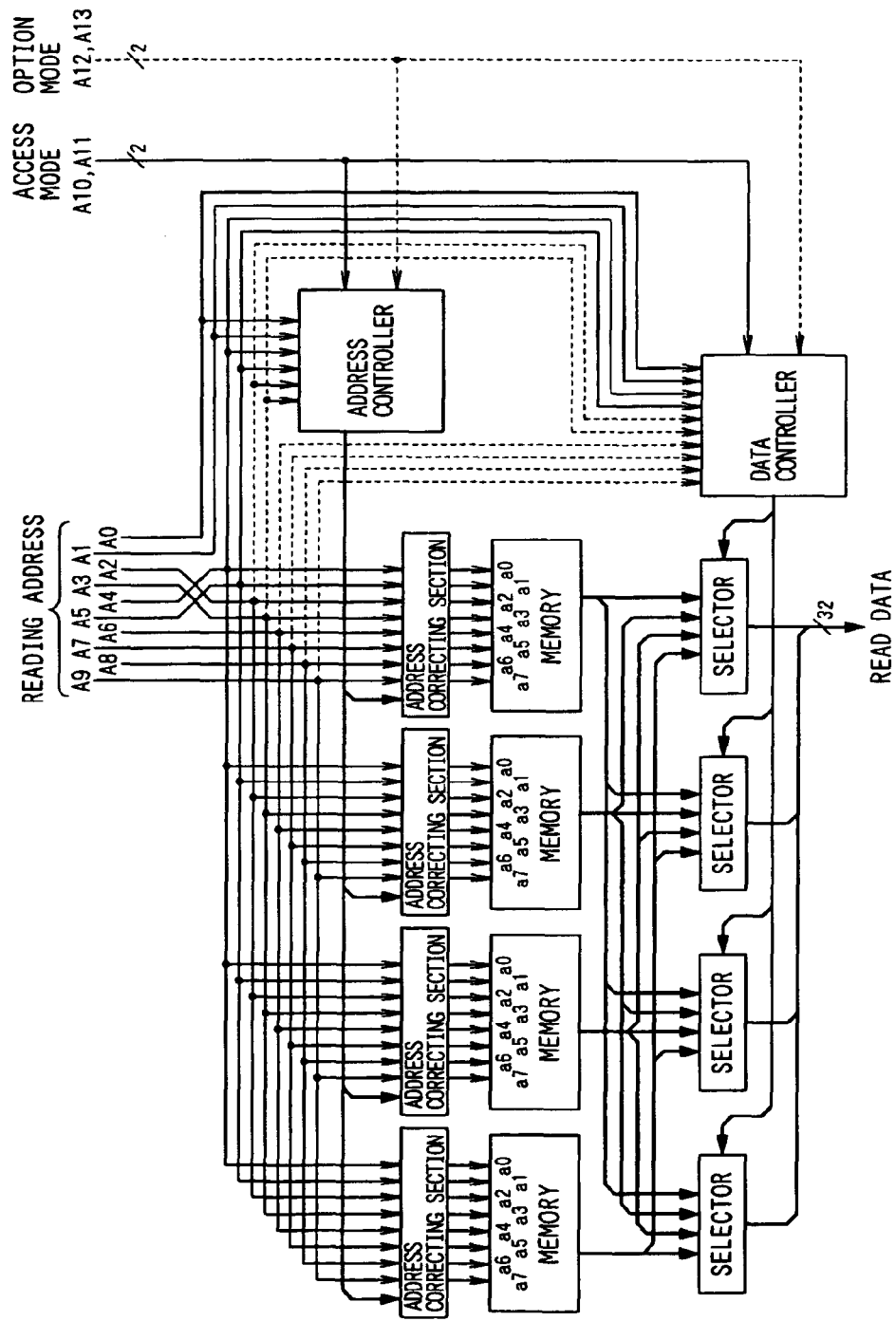
FIG. 33 is a block diagram showing a configuration example of a reading address control section and a read data control section when a signal is assigned as shown in FIG. 32.

In the first and second embodiments, a signal line for designating the access mode or option mode is input as another signal different from the address signal (reading address signal or writing address signal). However, the signal line for designating the access mode or option mode may be input together with the address signal. For example, the access mode or option mode may be assigned to the most significant bit of the address signal, as shown in FIG. 32. FIG. 33 is a block diagram showing a configuration example of the reading address control section and the read data control section when the signal is assigned as shown in FIG. 32.

With this configuration, when the two dimensional data access memory is employed to perform the processing, the user only needs to input the access mode or option mode, when inputting the address, so that the input operation becomes simpler. Also, because the constitution of the two dimensional data access memory is simpler, the circuit scale can be reduced, and the degree of integration can be increased.

As described above, the method of using the memory according to the invention can contribute to the more efficient SIMD operation.

Also, with the two dimensional data access memory of the invention, the continuous data or discontinuous data arranged in the transverse or longitudinal direction from the designated location in the two dimensional memory space can be read from the physical memories at the same time, whereby the efficient SIMD operation can be implemented.

Further, with the two dimensional data access memory of the invention, the continuous data arranged in the transverse or longitudinal direction from the designated location in the two dimensional memory space can be read from the physical memories at the same time, and can be written at the same time into the physical memories so that the data may be arranged continuously in the transverse or longitudinal direction from the designated location in the two dimensional memory space where by the efficient SIMD operation can be implemented. Also, the two dimensional data access memory can contribute to estimating the movement vector of the moving picture more efficiently.

Also, with the operation processing apparatus of the invention, the SIMD operation can be performed efficiently by employing the two dimensional data access memory of the invention.

What is claimed is:

1. A two dimensional data access memory having n physical memories supposing a two dimensional memory space including predefined virtual minimum two dimensional memory spaces two-dimensionally arranged side by side in a longitudinal direction and a transverse direction, with each reading address or writing address of each of said virtual minimum two dimensional memory spaces being respectively preassigned in a certain rule, comprising:

a read data control section for designating an access location in said virtual minimum two dimensional memory space, rearranging pieces of read data from said n physical memories in accordance with a reading direction for reading the data from the specified access location or a designated reading access mode for designating a reading pattern or a writing pattern, and outputting the rearranged pieces of read data collectively at the time of reading the data in the two dimensional memory space; and a reading address control section for modifying the designated reading address to a predetermined address and outputting the read data to the n memories in accordance with the designated reading access mode and the specified access location, or in accordance with the designated reading access mode if an access space extends over the adjacent virtual minimum two dimensional memory spaces at the time of designating the reading address, said read data control section comprising a data controller for outputting a selection signal for selecting the read data in said n physical memories in accordance with an access location in said virtual minimum two dimensional memory space that is specified in accordance with a designation of the reading address, and in accordance with a designation of the reading access mode, when reading the data, and n selectors, provided corresponding to said n physical memories, for selecting each of the read data from said n physical memories to output the read data at the same time on the basis of the selection signal from said data controller, and said reading address control section comprising an address controller for outputting an address conversion signal for converting the reading address corresponding to the lower address in each of said n physical memories to a predetermined value in accordance with the reading access mode and said reading address, or outputting a correction signal for correcting the reading address corresponding to the upper address in each of said n physical memories in accordance with the reading access mode if the access space extends over the adjacent virtual minimum two dimensional memory spaces, when designating the reading address, and n address correcting sections, provided corresponding to said n physical memories, for converting the reading address to a predetermined value upon the address conversion signal from said address controller to output the corrected reading address to each of said n physical memories, and correcting said reading address upon the correction signal from said address controller to output the corrected reading address to each of said n physical memories.

2. The two dimensional data access memory according to claim 1, further comprising:

a write data control section for specifying an access location in said virtual minimum two dimensional memory space, rearranging the pieces of write data into said n physical memories in accordance with a write access mode designating the writing direction of data from the specified access location, and supplying the rearranged pieces of write data to said n physical memories collectively at the time of writing the data; and a writing address control section for modifying the designated writing address to a predetermined address to output it to each of said n physical memories in accordance with the designated writing access mode and the specified access location, or in accordance with the designated writing access mode if the access space extends over said adjacent virtual minimum two dimensional memory spaces at the time of designating the writing address.

3. The two dimensional data access memory according to claim 2, said write data control section comprising a data controller for outputting a selection signal for selecting the write data into said n physical memories in accordance with an access location in said virtual minimum two dimensional memory space specified with a designation of the writing address, and in accordance with a designation of the writing access mode, at the time of writing the data, and n selectors, provided corresponding to said n physical memories, for selecting each piece of the write data into said n physical memories to supply each piece to each of said n physical memories at the same time on the basis of the selection signal from said data controller, and said writing address control section comprising an address controller for outputting an address conversion signal for converting the writing address corresponding to the lower address in each of said n physical memories to a predetermined value in accordance with the writing access mode and the writing address, or outputting a correction signal for correcting the writing address corresponding to the upper address in each of said n physical memories in accordance with the writing access mode if the access space extends over the adjacent virtual minimum two dimensional memory spaces, at the time of designating the writing address, and n address correcting sections, provided corresponding to said n physical memories, for converting the writing address to a predetermined value upon the address conversion signal from said address controller to output the corrected writing address to each of said n physical memories, and correcting the writing address upon the correction signal from said address controller to output the corrected writing address to each of said n physical memories.

4. An operation processing apparatus, comprising: two dimensional data access memory according to claim 1; and an SIMD type processor for performing the SIMD process by designating the address in said two dimensional data access memory in accordance with a predetermined arithmetic operation, as well as the access mode, and reading the predetermined data from said two dimensional data access memory.

5. The operation processing apparatus according to claim 4, said predetermined arithmetic operation comprising two dimensional discrete cosine conversion.

6. A two dimensional data access memory having n physical memories supposing a two dimensional memory space including predefined virtual minimum two dimensional memory spaces two-dimensionally arranged side by side in a longitudinal direction and a transverse direction, with each reading address or writing address of each of said virtual minimum two dimensional memory spaces being respectively preassigned in a certain rule, comprising:

a read data control section for designating an access location in said virtual minimum two dimensional memory space, rearranging pieces of read data from said n physical memories in accordance with a reading direction for reading the data from the specified access location or a designated reading access mode for designating a reading pattern or a writing pattern, and outputting the rearranged pieces of read data collectively at the time of reading the data in the two dimensional memory space; and a reading address control section for modifying the designated reading address to a predetermined address and outputting the read data to the n memories in accordance with the designated reading access mode and the specified access location, or in accordance with the designated reading access mode if an access space extends over the adjacent virtual minimum two dimensional memory spaces at the time of designating the reading address, said read data control section rearranges the pieces of read data from said n physical memories in accordance with an option mode for designating the data reading mode for estimating a movement vector, in addition to the designated reading access mode and the specified access location, and outputs the rearranged read data collectively, and said reading address control section modifying the designated reading address to a predetermined address to output the reading address to said n physical memories in accordance with the designated reading access mode and the specified access location, or in accordance with the designated reading access mode if the access space extends over the adjacent virtual minimum two dimensional memory space, or in accordance with the reading access mode and the option mode if the access space extends across the periphery of the two dimensional memory space at the time of designating the reading address.

7. The two dimensional data access memory according to claim 6, said read data control section comprising a data controller for outputting a selection signal for selecting the read data in said n physical memories in accordance with an access location in said virtual minimum two dimensional memory space specified in accordance with a designation of the reading address, and a designation of the reading access mode and a designation of the option mode, when reading the data, and n selectors, provided corresponding to said n physical memories, for selecting each of the read data from said n physical memories to output the read data at the same time on the basis of the selection signal from said data controller, and said reading address control section comprising an address controller for outputting an address conversion signal for converting the reading address corresponding to the lower address in each of said n physical memory to a predetermined value in accordance with the reading access mode and the reading address, or outputting a correction signal for correcting the reading address corresponding to the upper address in each of said n physical memories in accordance with the reading access mode if the access space extends over the adjacent virtual minimum two dimensional memory spaces, or outputting a correction signal for correcting the upper address in each of said n physical memories in accordance with the reading access mode and the option mode if the access space extends across the periphery of the two dimensional memory space, when designating the reading address, and n address correcting sections, provided corresponding to the n physical memories, for converting the reading address to a predetermined value upon the address conversion signal from said address controller to output the corrected reading address to each of said n physical memories, and correcting the reading address upon the correction signal from said address controller to output the corrected reading address to each of said n physical memories.

8. The two dimensional data access memory according to claim 6, said read data control section comprising a data controller for outputting a selection signal for selecting the read data in the n memories in accordance with an access location in said virtual minimum two dimensional memory space specified in accordance with a designation of the reading address, and a designation of the reading access mode and a designation of the option mode, when reading the data, and n selectors, provided corresponding to said n physical memories, for selecting each of the read data from said n physical memories to output the read data at the same time on the basis of the selection signal from said data controller, and said reading address control section comprising an address controller for outputting an address conversion signal for converting the reading address corresponding to the lower address in each of said n physical memories to a predetermined value in accordance with the reading access mode and the reading address, or outputting a correction signal for correcting the reading address corresponding to the upper address in each of said n physical memories in accordance with the reading access mode if the access space extends over the adjacent virtual minimum two dimensional memory spaces, or outputting a correction signal for correcting the upper address and the lower address in each of said n physical memories in accordance with the reading access mode and the option mode if the access space extends across the periphery of an existence range of data stored in said two dimensional memory space, when designating the reading address, and n address correcting sections, provided corresponding to said n physical memories, for converting the reading address to a predetermined value upon the address conversion signal from said address controller to output the corrected reading address to each of said n physical memories, and correcting the reading address upon the correction signal from said address controller to output the corrected reading address to each of said n physical memories.

9. An operation processing apparatus, further comprising: two dimensional data access memory according to claim 6; and an SIMD type processor for performing the SIMD process by designating the address in said two dimensional data access memory in accordance with a predetermined arithmetic operation, as well as the access mode and the option mode, and reading the predetermined data from said two dimensional data access memory.

10. The operation processing apparatus according to claim 9, said predetermined arithmetic operation comprising an operation process involving estimating the movement vector of moving a picture.

* * * * *